US012621645B2

(12) United States Patent
Kwon et al.

(10) Patent No.: US 12,621,645 B2
(45) Date of Patent: May 5, 2026

(54) APPARATUS AND METHOD FOR TRANSMITTING OR RECEIVING MESSAGE BY USING BLUETOOTH LOW ENERGY ADVERTISING

(71) Applicant: SAMSUNG ELECTRONICS CO., LTD., Suwon-si (KR)

(72) Inventors: Taejun Kwon, Suwon-si (KR); Sungkyu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 357 days.

(21) Appl. No.: 18/140,413

(22) Filed: Apr. 27, 2023

(65) Prior Publication Data

US 2023/0354004 A1    Nov. 2, 2023

Related U.S. Application Data

(63) Continuation of application No. PCT/KR2023/005289, filed on Apr. 19, 2023.

(30) Foreign Application Priority Data

Apr. 27, 2022    (KR) ........................ 10-2022-0052228

(51) Int. Cl.
| | |
|---|---|
| *H04W 8/00* | (2009.01) |
| *H04W 40/24* | (2009.01) |
| *H04W 4/80* | (2018.01) |

(52) U.S. Cl.
CPC ......... *H04W 8/005* (2013.01); *H04W 40/246* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,006,522 B1 * | 2/2006 | Wang | H04L 41/0604 |
| | | | 713/300 |
| 9,735,861 B2 | 8/2017 | Kim et al. | |
| 11,659,626 B2 | 5/2023 | Park et al. | |
| 2018/0279103 A1 | 9/2018 | Hong et al. | |

(Continued)

FOREIGN PATENT DOCUMENTS

| | | |
|---|---|---|
| JP | 2019-179973 A | 10/2019 |
| KR | 10-1728115 B1 | 4/2017 |

(Continued)

OTHER PUBLICATIONS

Extended European Search Report issued Apr. 3, 2025 by the European Patent Office for EP Patent Application No. 23796692.4.

(Continued)

*Primary Examiner* — Frantz Bataille
(74) *Attorney, Agent, or Firm* — Sughrue Mion, PLLC

(57) ABSTRACT

A method of transmitting a message by a home appliance includes generating a transmission message, generating one or more sub-transmission messages from the transmission message based on a limited length of a scan response data packet of Bluetooth low energy (BLE) advertising, transmitting a BLE advertising packet including header information of the transmission message, and transmitting one or more scan response data packets respectively including the one or more sub-transmission messages.

20 Claims, 18 Drawing Sheets

(56) References Cited

U.S. PATENT DOCUMENTS

| | | | |
|---|---|---|---|
| 2019/0306337 A1 | 10/2019 | Tachiwa | |
| 2020/0100091 A1* | 3/2020 | Lee | H04W 8/005 |
| 2020/0213903 A1 | 7/2020 | Wang et al. | |
| 2022/0264272 A1 | 8/2022 | Linn et al. | |
| 2023/0261528 A1 | 8/2023 | Park et al. | |

FOREIGN PATENT DOCUMENTS

| | | |
|---|---|---|
| KR | 10-2017-0082854 A | 7/2017 |
| KR | 10-2018-0004560 A | 1/2018 |
| KR | 10-1933557 B1 | 12/2018 |
| KR | 10-1936144 B1 | 1/2019 |
| KR | 10-2019-0095743 A | 8/2019 |
| KR | 10-2020-0017302 A | 2/2020 |
| KR | 10-2020-0029025 A | 3/2020 |
| KR | 10-2097987 B1 | 4/2020 |
| KR | 10-2099204 B1 | 5/2020 |
| KR | 10-2020-0137520 A | 12/2020 |
| KR | 10-2221849 B1 | 3/2021 |
| KR | 10-2287589 B1 | 8/2021 |
| WO | 2018/009040 A1 | 1/2018 |
| WO | 2021/076401 A1 | 4/2021 |
| WO | 2022/005258 A1 | 1/2022 |

OTHER PUBLICATIONS

Guillaume Celosia et al., "Saving Private Addresses: An Analysis of Privacy Issues in the Bluetooth-Low-Energy Advertising Mechanism", MobiQuitous '19: Proceedings of the 16th EAI International Conference on Mobile and Ubiquitous Systems: Computing, Networking and Services, Nov. 2019 (Published: Feb. 3, 2020), pp. 444-453, DOI: 10.1145/3360774.3360777.

International Search Report and Written Opinion issued on Jul. 14, 2023 by the International Searching Authority in International Patent Application No. PCT/KR2023/005289 (PCT/ISA/220, PCT/ISA/210, and PCT/ISA/237).

Communication dated Dec. 9, 2025, issued by the European Patent Office in European Application No. 23 796 692.4.

* cited by examiner

Figure 9:
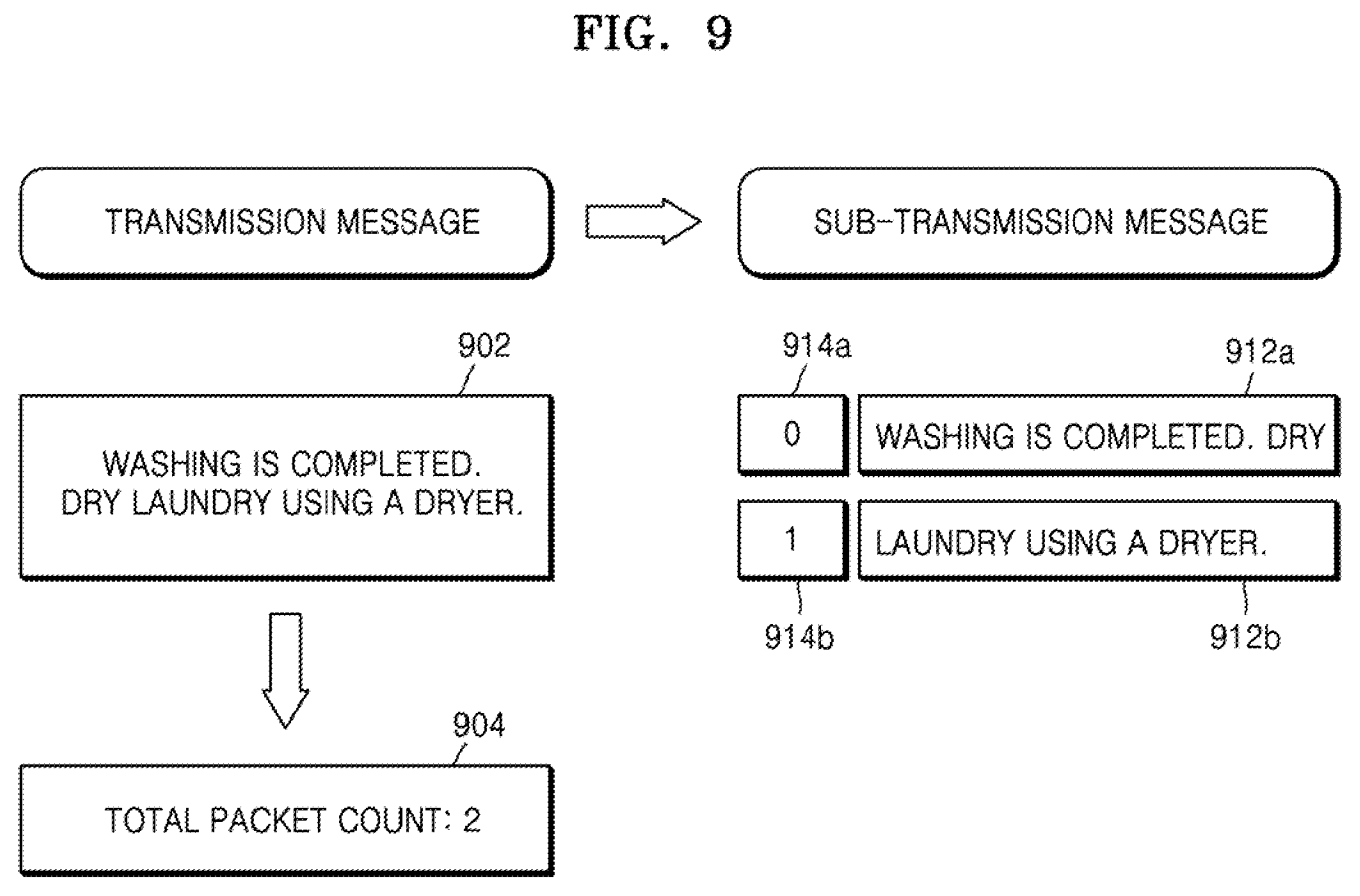

TRANSMISSION MESSAGE

902

WASHING IS COMPLETED. DRY LAUNDRY USING A DRYER.

904

TOTAL PACKET COUNT: 2

SUB-TRANSMISSION MESSAGE

912a

WASHING IS COMPLETED. DRY

914a

0

912b

LAUNDRY USING A DRYER.

<FIRST HEADER INFORMATION>

| ITEM | VALUE |
|---|---|
| SERVICE ID | |
| SERVICE VERSION INFORMATION | |
| MESSAGE ID | |
| PACKET INDEX INFORMATION | |
| TOTAL PACKET COUNT INFORMATION | |
| REMAINING ADVERTISING TIME INFORMATION | |
| ADVERTISING CHANGE TIME INFORMATION | |
| DISPLAY TIME INFORMATION | |
| ERROR DETECTION CODE INFORMATION | |

<SECOND HEADER INFORMATION>

| ITEM | VALUE |
|---|---|
| SERVICE ID | |
| SERVICE VERSION INFORMATION | |
| MESSAGE ID | |
| PACKET INDEX INFORMATION | |
| TOTAL PACKET COUNT INFORMATION | |
| REMAINING ADVERTISING TIME INFORMATION | |
| ADVERTISING CHANGE TIME INFORMATION | |
| DISPLAY TIME INFORMATION | |
| ERROR DETECTION CODE INFORMATION | |

| OPERATION INFORMATION | STATUS INFORMATION | NOTIFICATION EVENT | STATUS INFORMATION |
|---|---|---|---|
| REFRIGERATING MODE/ FREEZING MODE | DOOR OPEN | DOOR OPEN OVER REFERENCE TIME | REFRIGERATOR DOOR IS OPEN |
| REFRIGERATING MODE/ FREEZING MODE | CONTAINER INNER TEMPERATURE | TEMPERATURE LOWER THAN REFERENCE TEMPERATURE | REFRIGERATION TEMPERATURE IS LOW |

1710

APPARATUS AND METHOD FOR TRANSMITTING OR RECEIVING MESSAGE BY USING BLUETOOTH LOW ENERGY ADVERTISING

CROSS-REFERENCE TO RELATED APPLICATIONS

This application is a continuation application of International Application No. PCT/KR2023/005289, filed on Apr. 19, 2023, in the Korean Intellectual Property Office, which is based on and claims priority to Korean Patent Application No. 10-2022-0052228, filed on Apr. 27, 2022, the disclosures of each of which being incorporated by reference herein in their entireties.

BACKGROUND

1. Field

The disclosure relates to a method of transmitting, by a home appliance, a message by using Bluetooth low energy (BLE) advertising, a home appliance configured to transmit a message by using the BLE advertising, and a computer-readable recording medium having recorded thereon a program for executing, on a computer, the method of transmitting a message. In addition, the disclosure relates to a method of receiving, by a home appliance, a message by using the BLE advertising and a home appliance configured to receive a message by using the BLE advertising.

2. Description of Related Art

As the Internet of Things (IoT) environment has become widely distributed, a number of home appliances are connected to the internet via wireless communication, such as wireless fidelity (Wi-Fi), etc. Such home appliances connected to the internet may be controlled by or collect information through a server. However, as the number of home appliances grows, the amount of data processed by the internet network and server also increases exponentially. In this regard, direct communication among the home appliances without a server may lead to reducing the cost of the server and allowing for application in various scenarios.

To facilitate direct communication among the home appliances, a process of connecting the home appliances to each other is needed. However, such a process of connecting the home appliances requires an authentication process, which results in restricted use of the home appliances.

SUMMARY

In accordance with an aspect of the disclosure, a method of transmitting a message by a home appliance includes generating a transmission message; generating at least one sub-transmission message from the transmission message based on a limited length of a scan response data packet of Bluetooth low energy (BLE) advertising; transmitting a BLE advertising packet including header information of the transmission message; and transmitting at least one scan response data packet respectively including the at least one sub-transmission message.

In accordance with another aspect of the disclosure, a home appliance includes a communication module; a memory storing at least one instruction; and at least one processor connected to the memory and configured to execute the at least one instruction to generate a transmission message; generate at least one sub-transmission message from the transmission message based on a limited length of a scan response data packet of Bluetooth low energy (BLE) advertising; transmit, through the communication module, a BLE advertising packet of the BLE advertising including header information of the transmission message; and transmit, through the communication module, scan response data packet respectively including the at least one sub-transmission message.

In accordance with another aspect of the disclosure, a computer-readable recording medium having recorded thereon a program which, when executed by a computer, causes the computer to perform a method of transmitting a message by a home appliance includes generating a transmission message; generating at least one sub-transmission message from the transmission message based on a limited length of a scan response data packet of Bluetooth low energy (BLE) advertising; transmitting a BLE advertising packet including header information of the transmission message; and transmitting at least one scan response data packet respectively including the at least one sub-transmission message.

In accordance with another aspect of the disclosure, a method of receiving a message by a home appliance includes receiving a Bluetooth low energy (BLE) advertising packet including a message identification (ID), packet index information, and total packet counter information; generating a buffer for a transmission message corresponding to the message ID, the buffer having a storage capacity corresponding to the total packet counter information; receiving a scan response data packet corresponding to the BLE advertising packet; obtaining, from the scan response data packet, a sub-transmission message generated from the transmission message; storing the sub-transmission message in the buffer; iterating, until the storage capacity of the buffer is full, the receiving the BLE advertising packet, the obtaining the sub-transmission message from the scan response data packet, and the storing the sub-transmission message in the buffer; and outputting the transmission message generated from at least one sub-transmissions message stored in the buffer.

In accordance with another aspect of the disclosure, a home appliance includes an output interface; a communication module; a memory storing at least one instruction; and at least one processor connected to the memory and configured to access the memory and execute the at least one instruction to receive, through the communication module, a Bluetooth low energy (BLE) advertising packet including a message identification (ID), packet index information, and total packet count information; generate a buffer for a transmission message corresponding to the message ID, the buffer having a storage capacity corresponding to the total packet count information; receive, through the communication module, a scan response data packet corresponding to the BLE advertising packet; obtain, from the scan response data packet, a sub-transmission message generated from the transmission message; store the sub-transmission message in the buffer; iterate, until the storage capacity of the buffer is full, the receiving the BLE advertising packet, the obtaining the sub-transmission message from the scan response data packet, and the storing the sub-transmission message in the buffer; and output, through the output interface, the transmission message generated from at least sub-transmission message stored in the buffer.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a diagram illustrating operations of a home appliance according to an embodiment of the disclosure;

FIG. 5 is a diagram illustrating a Bluetooth low energy (BLE) advertising operation according to an embodiment of the disclosure;

FIG. 9 is a diagram illustrating a process of generating a transmission message and a sub-transmission message, according to an embodiment of the disclosure;

FIG. 11 is a diagram illustrating header information of a transmission message according to an embodiment of the disclosure;

DETAILED DESCRIPTION

Figure 2:
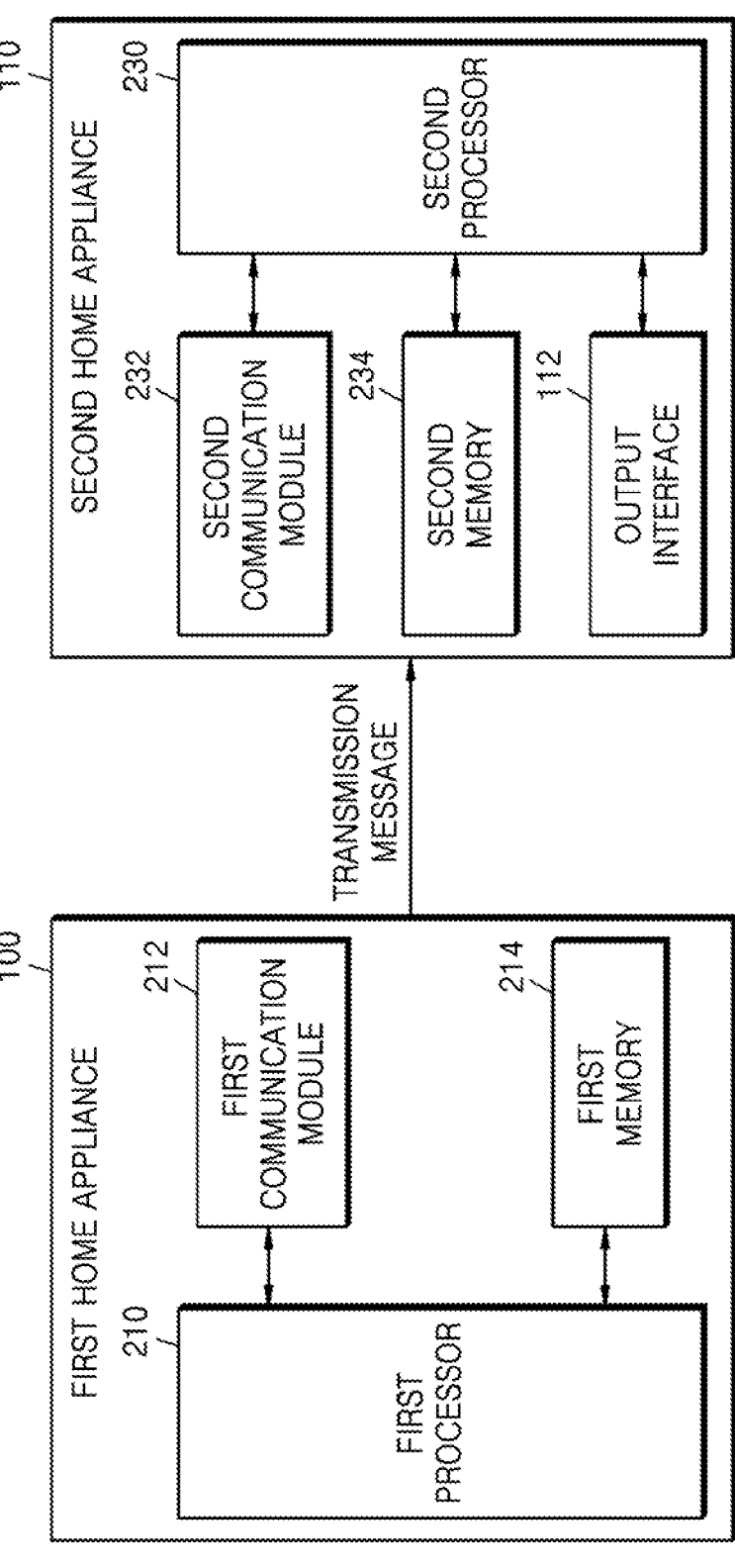
FIG. 2 is a diagram illustrating structures of a first home appliance and a second home appliance, according to an embodiment of the disclosure.

Throughout the disclosure, the expression "at least one of a, b or c" indicates only a, only b, only c, both a and b, both a and c, both b and c, all of a, b, and c, or variations thereof.

The principle of an embodiment of the disclosure are disclosed and described herein such that the scope of claims is clarified, and a person of ordinary skill in the art to which the embodiment of the disclosure pertain may carry out the embodiments disclosed in the claims. The embodiment of the disclosure may be implemented in various forms.

Like reference numerals in the drawings denote like components. The disclosure does not cover all elements of the embodiments, and matters which are deemed common in the art to which the embodiments pertain or any redundant matters among the embodiments are omitted. The terms "module" or "unit" used herein may be implemented by one of or a combination of two of a software, a hardware, and a firmware, and according to an embodiment of the disclosure, a plurality of "modules" or "units" may be implemented as a single element, or one "module" or "unit" may include a plurality of elements.

In the description of an embodiment of the disclosure, certain detailed explanations of the related art are omitted when it is deemed that they may unnecessarily obscure the essence of the disclosure. It will be understood that although the terms "first," "second," etc. may be used herein to describe various components, these terms are only used to distinguish one component from another.

In addition, through of the disclosure, when one component is "coupled to" or "connected to" another component, the phrase "coupled to" or "connected to" should be construed as meaning that one component is directly connected to another component or one component is coupled or connected indirectly to another component via an intervening component arranged therebetween unless otherwise described.

At least one embodiment provides an apparatus and a method for transmitting or receiving a message without an authentication process among home appliances, and a recording medium having stored therein a program for executing the method.

Hereinafter, various embodiments are described with reference to the attached drawings.

Figure 1:
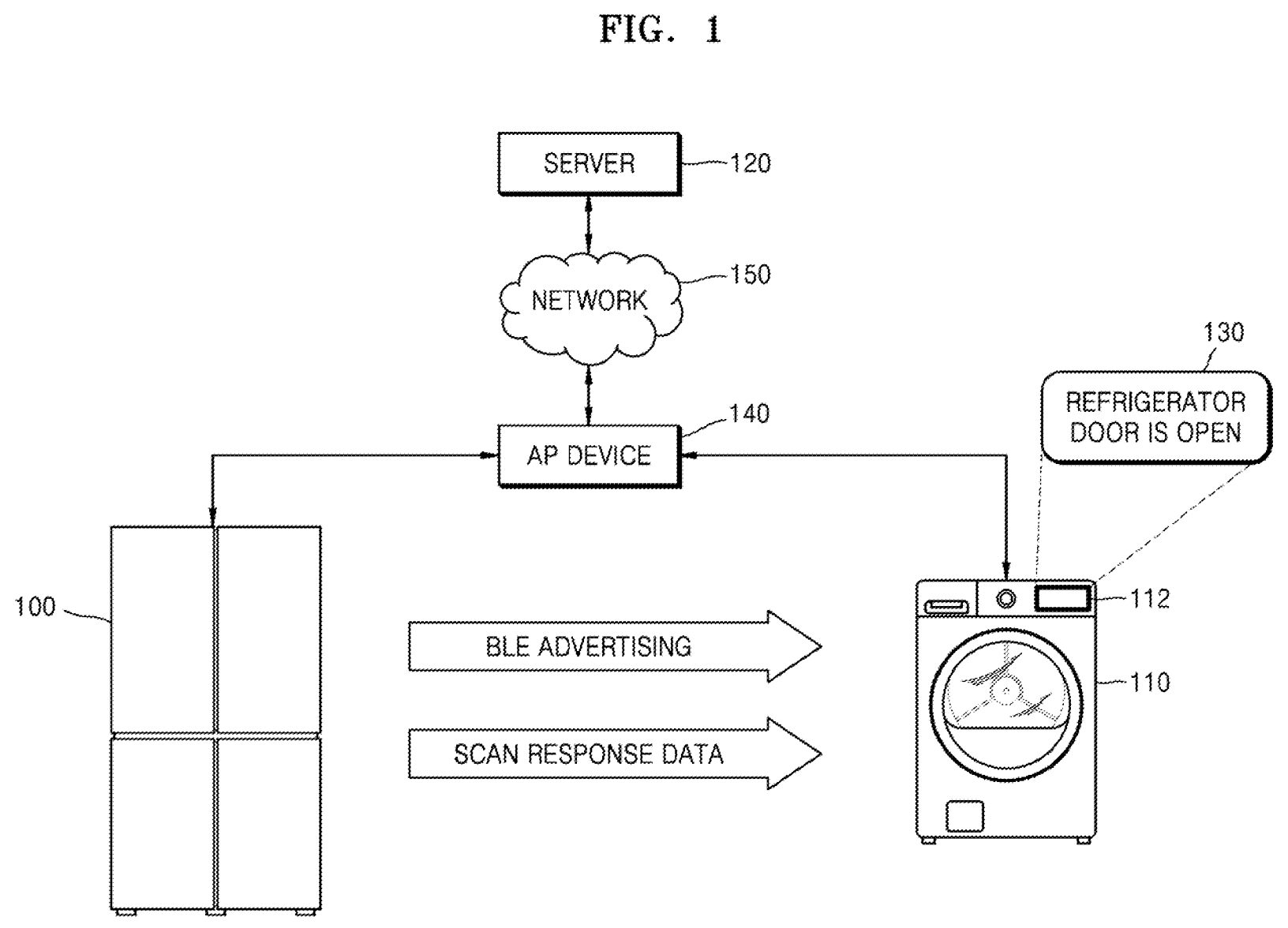

FIG. 1 is a diagram illustrating operations of a home appliance according to an embodiment of the disclosure.

A home appliance 100 and 110 according to an embodiment of the disclosure may be an electronic device configured to perform a certain function. The home appliance 100 and 110 may be arranged at certain positions inside a house, respectively. The home appliance 100 and 110 may include, for example, a refrigerator, a kimchi refrigerator, a washing machine, a television (TV), an air conditioner, an air purifier, a robot cleaner, a cleaner, a steam closet, an oven, a microwave, an induction, an audio output device, a smart home hub device, etc. The home appliance 100 and 110 may be registered to a certain account registered with a server 120 and communicate with the server 120. The home appliance 100 and 110 may be connected to a network 150 through an AP device 140 and communicate with the server 120 through the network 150. For example, the home appliance 100 and 110 may be connected to the AP device 140 by the Wi-Fi communication method.

The home appliance 100 and 110 according to an embodiment of the disclosure may transmit and receive a message among the home appliances 100 and 110 through Bluetooth low energy (BLE) advertising. In the disclosure, by way of example, a home appliance configured to transmit a message may be referred to as a first home appliance 100 and a home appliance configured to receive a message may be referred to as a second home appliance 110. The first home appliance 100 and the second home appliance 110 are distinguished from each other for convenience of description. However, both the first home appliance 100 and the second home appliance 110 may receive and transmit a message through the BLE advertising communication.

The BLE advertising refers to a communication method using BLE communication. The BLE advertising may broadcast a BLE advertising packet to inform a peripheral BLE communication device of device information which is to transmit the BLE advertising packet. The BLE communication device may perform a BLE scan by which a BLE communication signal is detected and received. The BLE advertising may support device-to-device (D2D) communication without going through the server 120. The BLE advertising may not require a process of establishing a communication channel among devices. Moreover, the BLE advertising may not require an authentication process. Accordingly, communication among unpreregistered devices by the BLE advertising may be performed.

According to an embodiment of the disclosure, the first home appliance 100 may correspond to a device configured to transmit a BLE advertising packet and the second home appliance 110 may correspond to a device configured to receive the BLE advertising packet.

The first home appliance 100 may broadcast a scan response data packet. Scan response data may have a data area of limited length. For example, in an embodiment of the disclosure, the scan response data may have a data area of 29 bytes. The first home appliance 100 may generate at least one sub-transmission message from a transmission message. For example, when the transmission message is less than 29 bytes, a sub-transmission message may be generated from the transmission message. When the transmission message is greater than 29 bytes, a plurality of sub-transmission messages may be generated from the transmission message by dividing the transmission message into the plurality of sub-transmission messages. In other words, the first home appliance 100 may divide the transmission message into a limited length corresponding to a data area of scan response data and insert the divided transmission message into the data area of the scan response data. The sub-transmission message may be inserted into the data area of each scan response data packet. The first home appliance 100 may sequentially transmit a scan response data packet corresponding to each sub-transmission message. The scan response data packet may be broadcasted by using the BLE advertising method.

The second home appliance 110 may receive the BLE advertising packet. The second home appliance 110 may perform a BLE scan during a certain time period. The second home appliance 110 may detect and receive the BLE advertising packet during performing the BLE scan. The second home appliance 110 may receive the BLE advertising packet and receive scan response data corresponding to the BLE advertising packet.

The second home appliance 110 may extract the sub-transmission message from the scan response data packet. The second home appliance 110 may extract the sub-transmission message of each scan response data packet.

The second home appliance 110 may generate a transmission message 130 from at least one sub-transmission message. The second home appliance 110 may output the transmission message 130 through an output interface 112.

The first home appliance 100 and the second home appliance 110 according to an embodiment of the disclosure may perform D2D communication without going through the server 120 by using the BLE advertising communication method. In an embodiment of the disclosure, by using the BLE advertising communication method, the first home appliance 100 may transmit a message to the second home appliance 110 without a separate communication channel establishment process and authentication process, and the second home appliance 110 may receive the message from the first home appliance 100 without a separate communication channel establishment process and authentication process.

FIG. 2 is a diagram illustrating structures of a first home appliance and a second home appliance, according to an embodiment of the disclosure.

The first home appliance 100 may be a device configured to transmit a transmission message. The first home appliance 100 may include a first processor 210, a first communication module 212, and a first memory 214.

The first processor 210 may control all operations of the first home appliance 100. The first processor 210 may be implemented by one or more processors. The first processor 210 may execute an instruction or a command stored in the first memory 214 to perform a certain operation. The first processor 210 may control operations of components included in the first home appliance 100.

The first communication module 212 may communicate with an external device in a wired or wireless manner. The first communication module 212 may communicate with the second home appliance 110 and the server 120. The first communication module 212 may communicate with the second home appliance 110 by using the BLE method. In an embodiment of the disclosure, the first communication module 212 may communicate with the second home appliance 110 by using communication methods other than the BLE method. For example, the first communication module 212 may communicate with the second home appliance 110 through Bluetooth, BLE, or Wi-Fi communication connection. Moreover, the first communication module 212 may communicate with the server 120 by using a long distance communication method. For example, the first communication module 212 may communicate with the AP device 140 through Wi-Fi and communicate with the server 120 through a long distance communication network connected to the AP device 140.

The first communication module 212 may include a wireless communication module (e.g., a cellular communication module, a short range wireless communication module, or a global navigation satellite system (GNSS) communication module), or a wired communication module (e.g., a local area network (LAN) communication module, or a power line communication module). The first communication module 212 may perform short range communication and may use, for example, BLE, near field communication, WLAN (Wi-Fi), Zigbee, infrared data association (IrDA) communication, Wi-Fi direct (WFD), ultra wideband (UWB), Ant+ communication, etc. In another example, the first communication module 212 may perform long distance communication and may communicate with an external device through, for example, a legacy cellular network, a 5G network, a next generation communication network, internet, a computer network (e.g., LAN or WAN), etc.

The first communication module 212 may establish communication with the second home appliance 110 and the server 120 according to the control by the first processor 210. The first communication module 212 may transmit a control signal and data to the second home appliance 110 and the server 120 or receive a control signal and data from the second home appliance 110 and the server 120.

The first home appliance 100 may be registered at a certain account registered with a server 120 and communicate with the server 120.

The first memory 214 may store various information, data, instructions, programs, etc. required for operations of the first home appliance 100. The first memory 214 may include at least one of a volatile memory or a non-volatile memory or a combination thereof. The first memory 214 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The first memory 214 may correspond to a web storage or a cloud server which performs a storage function on the internet.

The first processor 210 may generate a transmission message. The transmission message may be generated based on the status information or operation information of the first home appliance 100. The status information may represent a status of the first home appliance 100 detected by using a sensor provided in the first home appliance 100. For example, the status information may include a door open/close status, communication status, status of parts, etc. The operation information may include information about whether the first home appliance 100 is being operated or information about an operation mode. For example, the operation information may include information about whether the first home appliance 100 is being operated in a particular mode or in which mode the first home appliance 100 is being operated.

According to an embodiment of the disclosure, the first processor 210 may generate a notification event based on the status information of operation information of the first home appliance 100. When the notification event is generated, the first home appliance 100 may transmit notification event information to the server 120 or other home appliances. The first memory 214 may store a notification event lookup table showing the cases where a notification event occurs, based on the status information or operation information. When a notification event corresponding to the status information or operation information of the first home appliance 100 is detected, the first processor 210 may generate a notification event based on the notification event lookup table stored in the first memory 214. The first processor 210 may generate a transmission message including information about the notification event.

The first processor 210 may transmit a BLE advertising packet and a scan response data packet based on the transmission message. The BLE advertising packet and the scan response data packet may be transmitted in pairs. For example, after transmission of a first BLE advertising packet and a first scan response data packet is completed, a second BLE advertising packet and a second scan response data packet may be transmitted, followed by transmission of a third BLE advertising packet and a third scan response data packet.

The BLE advertising packet may include header information of the transmission message. The header information may include information about a remaining advertising time in an effective time for a transmission operation of the transmission message. According to an embodiment of the disclosure, the first home appliance 100 may set a certain effective time and transmit the transmission message by using the BLE advertising method. When the transmission message is transmitted by using the BLE advertising method, the first home appliance 100 may not know whether the transmission message is received by other home appliances. According to an embodiment of the disclosure, the first home appliance 100 may set an effective time and prevent excessive repetition of operation by repetitively transmitting the transmission message a certain number of times within the effective time. The remaining advertising time information may represent a remaining effective time at a point of time of transmission of the BLE advertising packet. Since the BLE advertising packet and the scan response data packet are transmitted multiple times, the remaining effective time may be changed at each point of time of transmission. According to an embodiment of the disclosure, since the BLE advertising packet includes remaining advertising time information, the second home appliance 110 receiving the BLE advertising packet may obtain information about remaining effective time from the current time. In an embodiment of the disclosure, when setting time for BLE scan, the second home appliance 110 may set the time for BLE scan based on the remaining advertising time information.

The scan response data packet may include a sub-transmission message generated from a transmission message. For example, in an embodiment of the disclosure, the scan response data packet may include a sub-transmission message that has been divided from the transmission message. According to the BLE advertising method, the scan response data packet may have a total size of 31 bytes. The scan response data packet may include an advertising information area and a data area. The data area may have a limited size. For example, the data area may have a size of 29 bytes. In some situations, the transmission message may have a size greater than the size of the data area. Thus, according to an embodiment of the disclosure, the first processor 210 may divide the transmission message into a limited length corresponding to a size of the data area of the scan response data packet to generate a sub-transmission message. For example, when the transmission data has a size of 40 bytes and the limited length corresponds to 29 bytes, the first processor 210 may divide the transmission message into two parts to generate two sub-transmission messages.

The first processor 210 may generate the BLE advertising packet and the scan response data packet for each sub-transmission message. For example, the first processor 210 may generate a first BLE advertising packet and a first scan response data packet which correspond to a first sub-transmission message. The first processor 210 may insert the first sub-transmission message into the first scan response data packet. The first processor 210 may generate a second BLE advertising packet and a second scan response data packet which correspond to a second sub-transmission message. The first processor 210 may insert the second sub-transmission message into the second scan response data packet.

The first processor 210 may transmit each BLE advertising packet and each scan response data packet through the first communication module 212. The first processor 210 may control the first communication module 212 to sequentially transmit each BLE advertising packet and each scan response data packet. In this regard, the first communication module 212 may broadcast the BLE advertising packet and the scan response data packet instead of designating a receiver device. Each BLE advertising packet and each scan response data packet may be sequentially transmitted in pairs. For example, the first communication module 212 may transmit the first BLE advertising packet, the first scan response data packet, the second BLE advertising packet, and the second scan response data packet in this stated order.

The first processor 210 may repetitively transmit the transmission message a certain number of times within the effective time. For example, the first processor 210 may repetitively transmit the transmission message two times within the effective time.

The second home appliance 110 may receive the transmission message. The second home appliance 110 may include a second processor 230, a second communication module 232, a second memory 234, and an output interface 112.

The second processor 230 may control operations of the second home appliance 110. The second processor 230 may be implemented by one or more processors. The second processor 230 may execute an instruction or a command stored in the second memory 234 to perform a certain operation. The second processor 230 may control operations of components included in the second home appliance 110.

The second communication module 232 may communicate with an external device in a wired or wireless manner. The second communication module 232 may communicate with the first home appliance 100 and the server 120. The second communication module 232 may communicate with the first home appliance 100 by using the BLE method. In an embodiment of the disclosure, the second communication module 232 may communicate with the first home appliance 100 by using communication methods other than the BLE method. For example, the second communication module 232 may communicate with the first home appliance 100 through Bluetooth, BLE, or Wi-Fi communication connection. Moreover, the second communication module 232 may communicate with the server 120 by using a long distance communication method. For example, the second communication module 232 may communicate with the AP device 140 through Wi-Fi and communicate with the server 120 through a long distance communication network connected to the AP device 140.

The second communication module 232 may include a wireless communication module (e.g., a cellular communication module, a short range wireless communication module, or a global navigation satellite system (GNSS) communication module), or a wired communication module (e.g., a local area network (LAN) communication module, or a power line communication module). The second communication module 232 may perform short range communication and may use, for example, BLE, near field communication, WLAN (Wi-Fi), zigbee, infrared data association (IrDA) communication, Wi-Fi direct (WFD), ultra wideband (UWB), Ant+ communication, etc. In another example, the second communication module 232 may perform long distance communication and may communicate with an external device through, for example, a legacy cellular network, a 5G network, a next generation communication network, internet, a computer network (e.g., LAN or WAN), etc.

The second communication module 232 may establish communication with the first home appliance 100 and the server 120 according to the control by the second processor 230. The second communication module 232 may transmit a control signal and data to the first home appliance 100 and the server 120 or receive a control signal and data from the first home appliance 100 and the server 120.

The second home appliance 110 may be registered at a certain account registered with a server 120 and communicate with the server 120.

The second memory 234 may store various information, data, instructions, programs, etc. required for operations of the second home appliance 110. The second memory 234 may include at least one of a volatile memory or a non-volatile memory or a combination thereof. The second memory 234 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EE-PROM), programmable read-only memory (PROM), a magnetic memory, a magnetic disk, and an optical disk. The second memory 234 may correspond to a web storage or a cloud server which performs a storage function on the internet.

The output interface 112 may output operation information, status information, a message, guide information, etc. of the second home appliance 110. The output interface 112 may output the transmission message received from the first home appliance 100. The output interface 112 may include, for example, a display, a speaker, a LED, etc.

The second home appliance 110 may perform a BLE scan during a certain time period. The second processor 230 may control the second communication module 232 to perform the BLE scan during a certain time period. The second communication module 232 may perform the BLE scan to detect and receive the BLE advertising packet.

When the BLE advertising packet is received, the second processor 230 may generate a buffer based on header information included in the BLE advertising packet. The buffer may be generated in the second memory 234 or in a separate storage space. The second processor 230 may determine a size of a buffer base on total packet count information included in the header information and generate a buffer of the determined size. In an embodiment of the disclosure, the buffer may include a plurality of buffers allocated to each sub-transmission message. Each of the plurality of buffers may correspond to a packet index.

The second processor 230 may obtain the sub-transmission messages from the received scan response data packets. The second processor 230 may store each sub-transmission message in the buffer. The second processor 230 may store the sub-transmission message in a buffer space corresponding to the sub-transmission message based on packet index information of each sub-transmission message.

When the allocated buffer is full, the second processor 230 may generate a transmission message from the sub-transmission message stored in the buffer. The second processor 230 may generate the transmission message by arranging the sub-transmission messages in order.

The second processor 230 may output the transmission message through the output interface 112. The output interface 112 may display the transmission message. In another example, the output interface 112 may output an audio signal including the transmission message through a speaker.

Figure 3:
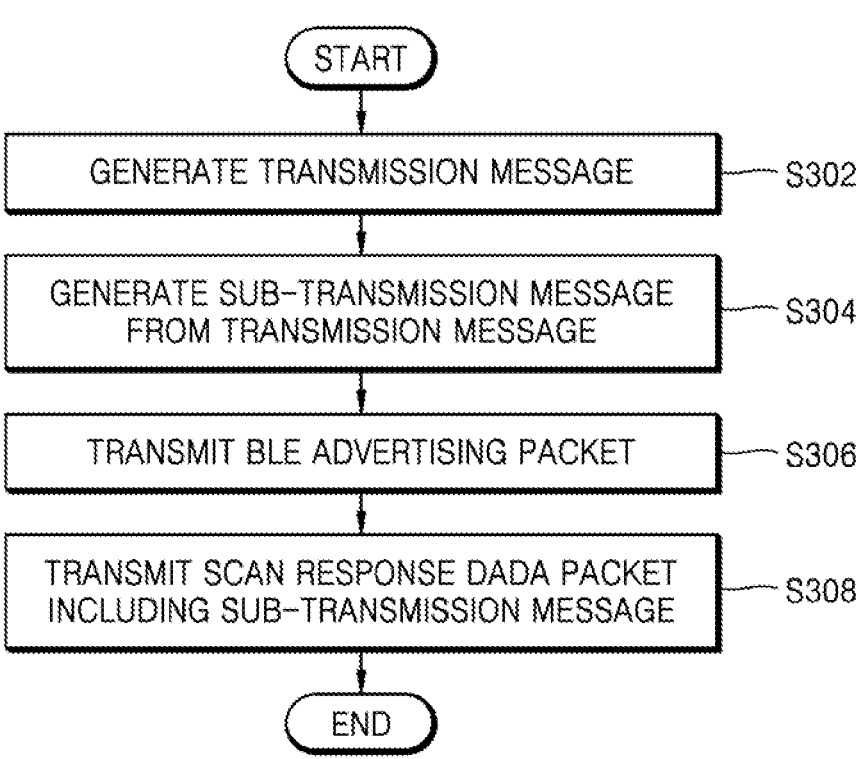
FIG. 3 is a flowchart illustrating a method of transmitting a message by a home appliance, according to an embodiment of the disclosure.

FIG. 3 is a flowchart illustrating a method of transmitting a message by a home appliance according to an embodiment of the disclosure.

Each operation of a method of transmitting a message by a home appliance according to an embodiment of the disclosure may be performed by various types of electronic devices including a processor and a communication module. In the disclosure, an embodiment of the disclosure is described focusing on the case where the first home appliance 100 performs the method of transmitting a message. Accordingly, an embodiment of the disclosure describing the first home appliance 100 may be applied to an embodiment of the disclosure describing the method of transmitting a message, and vice versa. The method of transmitting a message according to embodiments is not limited to the embodiment of the disclosure in which the method is performed by the first home appliance 100 and may be carried out by various types of electronic devices.

In operation S302, the first home appliance 100 may generate a transmission message. The first home appliance 100 may generate the transmission message based on status information or operation information of the first home appliance 100. The first home appliance 100 may detect a notification event based on the status information or operation information and generate a transmission message corresponding to the notification event.

Next, in operation S304, the first home appliance 100 may generate a sub-transmission message from the transmission message. For example, the first home appliance 100 may generate a plurality of sub-transmission messages by dividing the transmission message to generate the sub-transmission messages. The first home appliance 100 may divide the transmission message into a certain limited length. The limited length of the transmission message may be limited by a size of a scan response data packet. The scan response data packet may include a data area and the limited length of the transmission message may be determined by a size of the data area of the scan response data packet. The first home appliance 100 may determine the number of sub-transmission messages to be generated based on the size of the transmission message. In some case, when the size of the transmission message is less that the certain limited length, one sub-transmission message may be generated. Thus, the first home appliance 100 may generate from the transmission message at least one sub-transmission message having a length less than or equal to the limited length.

Then, in operation S306, the first home appliance 100 may transmit a BLE advertising packet. For example, the first home appliance 100 may transmit a BLE advertising packet including header information of the transmission message.

The first home appliance 100 may generate the header information of the transmission message. According to an embodiment of the disclosure, the header information may include information about remaining advertising time in effective time for a transmission operation of the transmission message. According to an embodiment of the disclosure, the header information may include at least one of a service identification (ID), service version information, a message ID, packet index information, total packet count information, remaining advertising time information, advertising change time information, display time information, or an error detection code. The packet index information and the remaining advertising time may be updated based on a point of transmission of each BLE advertising packet. The error detection code may be an error detection code corresponding to the entire transmission message.

When the header information of the transmission message is generated, the first home appliance 100 may insert the header information of the transmission message into the BLE advertising packet. The first home appliance 100 may be inserted into a payload area of a packet data unit (PDU)

of the BLE advertising packet. The BLE advertising packet and the scan response data packet may be generated in pairs. The header information of the BLE advertising packet may be generated with respect to each pair of the BLE advertising packet and the scan response data packet.

In operation S308, the first home appliance 100 may transmit a scan response data packet including the sub-transmission message. The scan response data packet may be generated for each of one or more sub-transmission messages. The BLE advertising packet corresponding to each scan response data packet may be generated. In other words, a scan response data packet may be generated for each sub-transmission message, and a BLE advertising packet may be generated for each scan response data packet, such that there is a one-to-one correspondence among the BLE advertising packets, the scan response data packets, and the sub-transmission messages. The first home appliance 100 may sequentially transmit each of pairs of BLE advertising packet and scan response data packet. Each pair of BLE advertising packet and scan response data packet may be transmitted according to an index order of the sub-transmission message.

According to an embodiment of the disclosure, the first home appliance 100 may transmit the transmission message multiple times. For example, after at least one sub-transmission message is transmitted once, at least one sub-transmission message may be transmitted once again. In this case, after the scan response data packet corresponding to at least one sub-transmission message is transmitted sequentially, the transmission may be repeated once more.

The operation of transmitting the BLE advertising packet and the operation of transmitting the scan response data packet may be performed within the effective time for the transmission operation and may be stopped when the effective time for the transmission operation expires.

Figure 4:
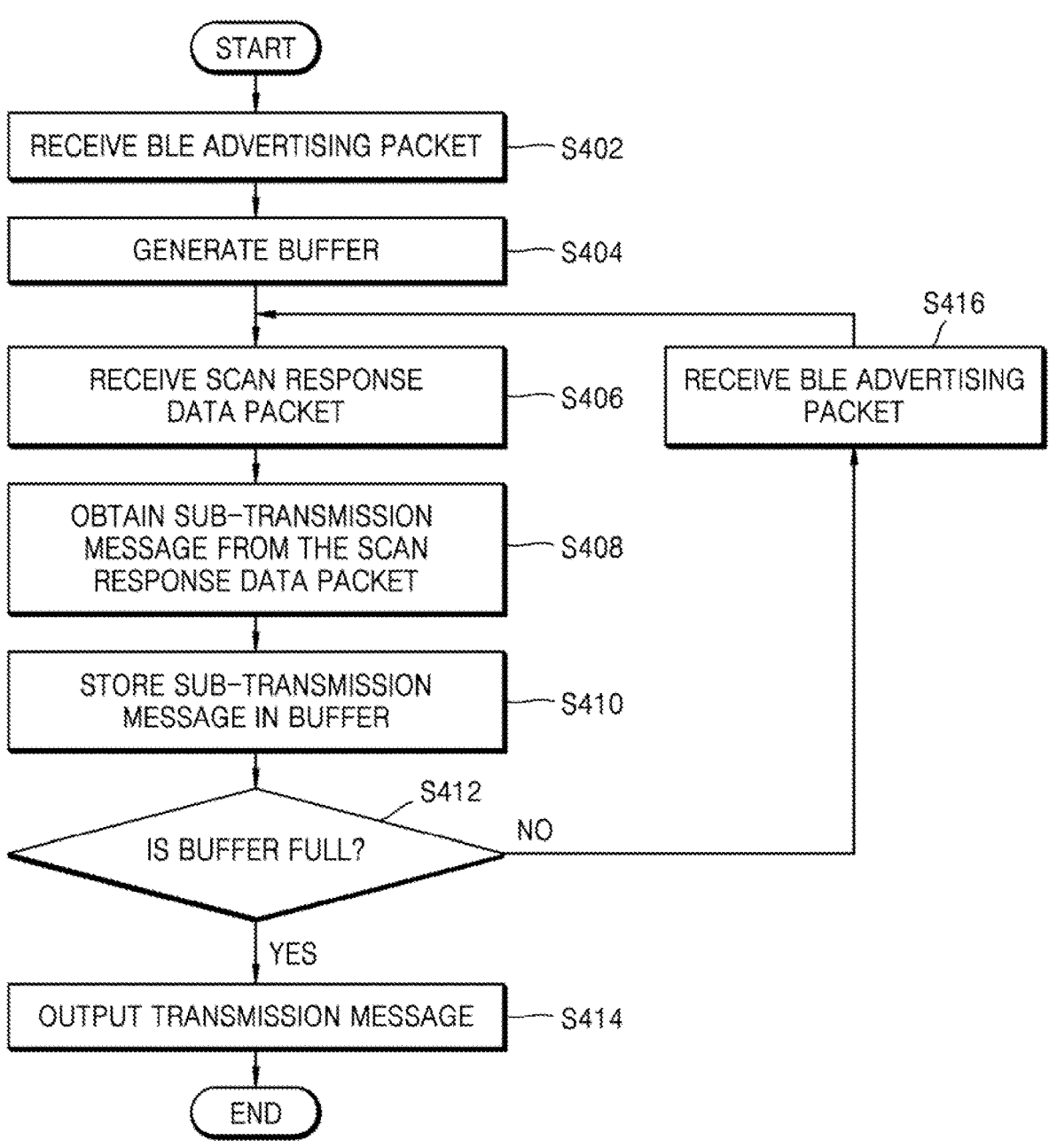
FIG. 4 is a flowchart illustrating a method of receiving a message by a home appliance, according to an embodiment of the disclosure.

FIG. 4 is a flowchart illustrating a method of receiving a message by a home appliance according to an embodiment of the disclosure.

Each operation of a method of receiving a message by a home appliance according to an embodiment of the disclosure may be performed by various types of electronic devices including a processor, a communication module, and an output interface. In the disclosure, an embodiment of the disclosure is described focusing on the case where the second home appliance 110 performs the method of receiving a message. Accordingly, embodiments describing the second home appliance 110 may be applied to embodiments describing the method of receiving a message, and vice versa. The method of receiving a message according to embodiments is not limited to the embodiment of the disclosure in which the method is performed by the second home appliance 110 and may be carried out by various types of electronic devices.

In operation S402, the second home appliance 110 may receive the BLE advertising packet. For example, the second home appliance 110 may perform a BLE scan, and receive the BLE advertising packet during the BLE scan.

The BLE scan may be an operation of receiving and detecting a BLE packet. The second home appliance 110 may perform the BLE scan and detect a BLE packet in a standby power status. The second home appliance 110 may perform the BLE scan in the standby power status to detect and receive the BLE advertising packet output from the first home appliance 100. Accordingly, the second home appliance 110 may detect and receive the BLE advertising packet of the first home appliance 100 in the standby power status through home screen, etc.

The second home appliance 110 may obtain header information of the transmission message included in the BLE advertising packet. The second home appliance 110 may determine whether to receive and process the scan response data based on the manufacturer information and service ID included in the header information of the transmission message. The second home appliance 110 may determine whether the received BLE advertising packet corresponds to a function supported by the device based on the manufacturer information and service ID included in the header information. For example, the second home appliance 110 may determine whether the manufacturer information and service ID are supported by a software installed in the home appliance. To this end, the second home appliance 110 may store a lookup table generated based on the manufacturer information and service ID and determine whether the BLE advertising packet corresponds to a function supported by the device based on the stored lookup table.

According to an embodiment of the disclosure, when the BLE advertising packet corresponds to the device, the second home appliance 110 may generate and transmit a scan response request. The scan response request may include at least one of a transmission device ID or a message ID included in the BLE advertising packet.

The second home appliance 110 may generate a buffer in operation S404. For example, when the BLE advertising packet corresponds to a function supported by the electronic device, the second home appliance 110 may generate the buffer. The second home appliance 110 may obtain total packet count information from the header information of the transmission message and determine a size of the buffer based on the total packet count information. According to an embodiment of the disclosure, the second home appliance 110 may generate a buffer for each sub-transmission message as many as the total packet count number based on the limited length of the sub-transmission message. The buffer for each sub-transmission message may have an index. The sub-transmission message may be stored in a buffer corresponding to an index of the sub-transmission message.

In operation S406, the second home appliance 110 may receive a scan response data packet. The second home appliance 110 may receive a scan response data packet in correspondence to the scan response request. The second home appliance 110 may receive the scan response data packet by the BLE scan operation.

In operation S408, the second home appliance 110 may obtain the sub-transmission message from the scan response data packet. For example, the sub-transmission message may have been generated by dividing the transmission message as discussed above.

In operation S410, the second home appliance 110 may store the sub-transmission message in the buffer. The second home appliance 110 may obtain packet index information of the sub-transmission message from the header information obtained from the BLE advertising packet. The second home appliance 110 may store the obtained sub-transmission message in a buffer space corresponding to the packet index information of the sub-transmission message.

In operation S412, the second home appliance 110 may determine whether the buffer is full. The buffer may be generated to have a size corresponding to the total length of the transmission message based on the total packet count information of the header information. When the buffer is full, the receipt of the transmission message is completed. The second home appliance 110 may determine whether the buffer is full to identify completion of receipt of the transmission message.

When the buffer is not full (operation S412, NO), the second home appliance 110 may iterate operation S416 of receiving the BLE advertising packet and operations S406, S408, S410, and S412. Repeated description of these operations is omitted for conciseness.

When the buffer is full (operation S412, YES), in operation S414, the second home appliance 110 may output the transmission message stored in the buffer through the output interface.

Figure 5:
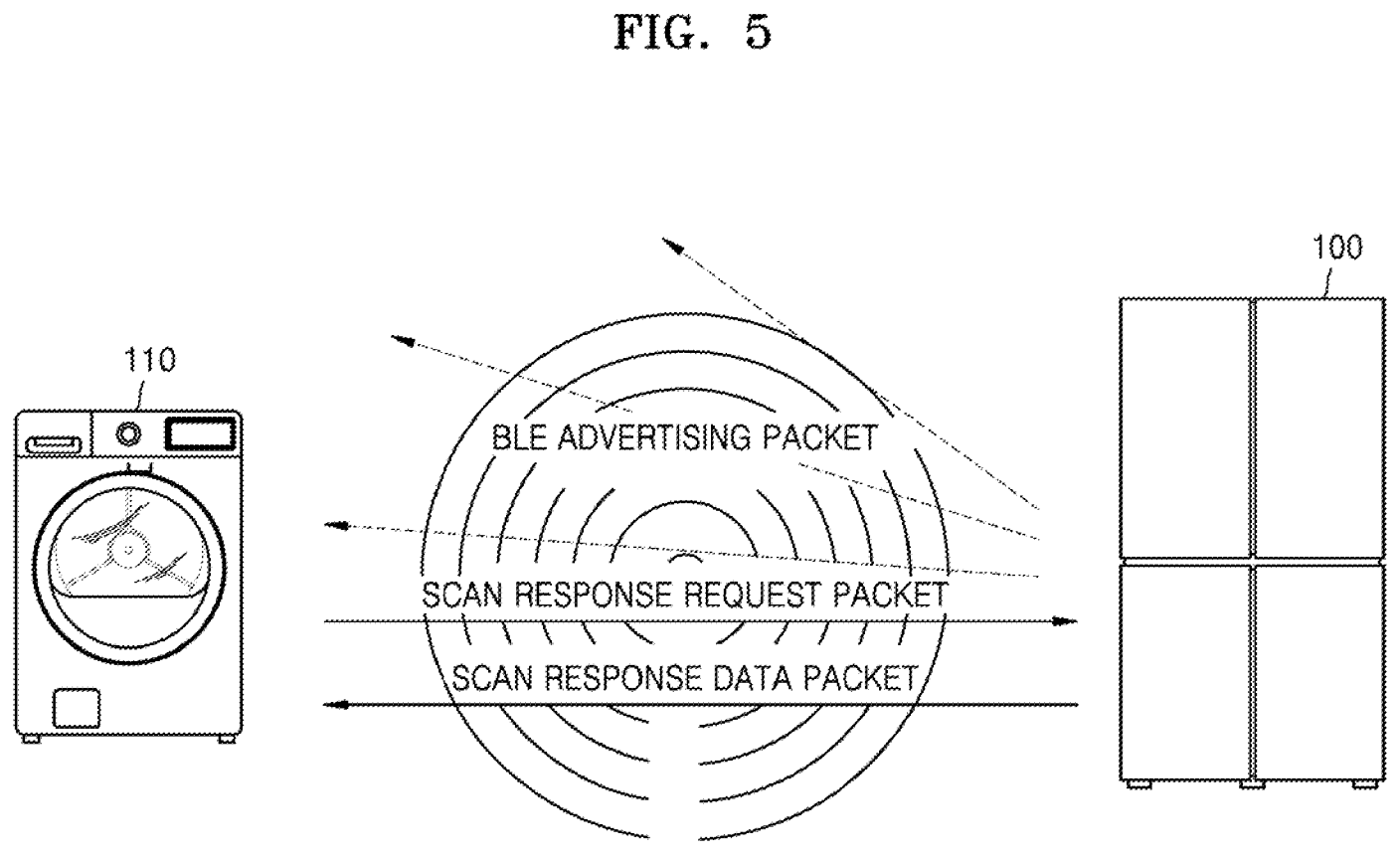

FIG. 5 is a diagram illustrating a BLE advertising operation according to an embodiment of the disclosure.

In the BLE advertising communication, three types of packets, i.e., a BLE advertising packet, a scan response request packet, and a scan response data packet, may be used. In the BLE advertising communication, a BLE advertising packet is generally broadcasted. A device configured to transmit the BLE advertising packet may be referred to as an advertiser device, and a device configured to receive the BLE advertising packet may be referred to an observer device. When the observer device performs the BLE scan and transmits a scan response request packet, the advertiser advice may transmit a scan response data packet.

According to an embodiment of the disclosure, the first home appliance 100 may correspond to the advertiser device and the second home appliance 110 may correspond to the observer device. As described above, the first home appliance 100 may insert header information of the transmission message into the BLE advertising packet to transmit the BLE advertising packet, and insert the sub-transmission message into the scan response data packet to transmit the scan response data packet. The second home appliance 110 may transmit the scan response request packet in response to the BLE advertising packet. According to an embodiment of the disclosure, the first home appliance 100 may transmit the scan response data packet only when the scan response request packet is received. According to an embodiment of the disclosure, the first home appliance 100 may transmit the scan response data packet regardless of whether the scan response request packet is received.

In the BLE advertising operation, the first home appliance 100 may not know information about the second home appliance 110. The first home appliance 100 may not know device information of the second home appliance 110, whether the BLE advertising packet is received, whether the BLE scan is performed, whether the scan response data packet is received, whether the transmission message is successfully received, etc. The first home appliance 100 may broadcast the BLE advertising packet and the scan response data packet at a set time within a set effective time period. The first home appliance 100 may broadcast the BLE advertising packet and the scan response data packet without designating a receiver device.

Figure 6:
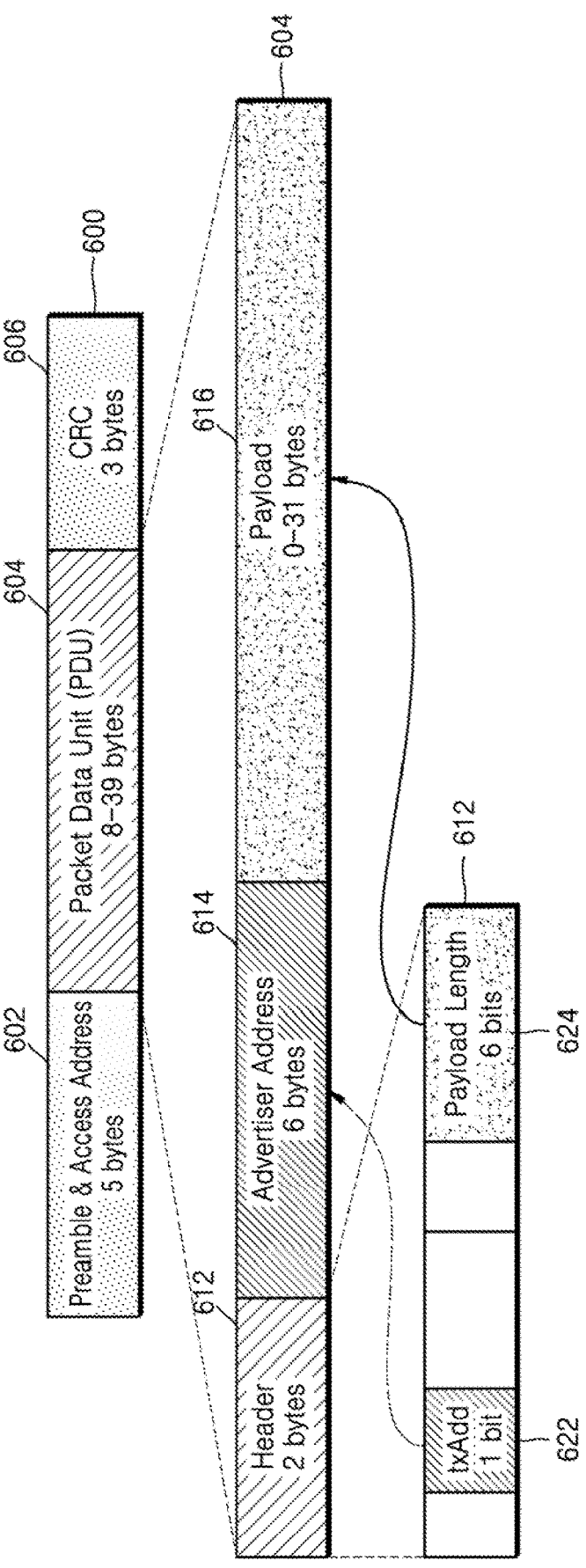
FIG. 6 is a diagram illustrating a structure of a BLE advertising packet according to an embodiment of the disclosure.

FIG. 6 is a diagram illustrating a structure of a BLE advertising packet according to an embodiment of the disclosure.

A BLE advertising packet 600 according to an embodiment of the disclosure may include a preamble & access address area 602, a packet data unit area 604, and a cyclic redundancy check (CRC) area 606. The BLE advertising packet 600 may have a certain limited size.

The preamble & access address area 602 may include preamble and access address information. According to an embodiment of the disclosure, the access address information may be a value randomly generated for advertising in a link layer rather than a MAC address. The preamble & access address area 602 may have a limited size of 5 bytes.

The packet data unit area 604 may store data included in the packet. The packet data unit area 604 may have a limited size of 8 bytes to 39 bytes.

The CRC area 606 may include CRC information. The CRC refers to a method of determining a check value for checking, when data is transmitted, whether there is an error in transmitted data. The CRC information of the BLE advertising packet may be inserted into the CRC area 606. The first home appliance 100 may generate CRC information of the BLE advertising packet and insert the CRC information into the CRC area 606. The second home appliance 110 may check whether there is an error in the received BLE advertising packet by using the CRC information. The CRC area 606 may have a limited size of 3 bytes.

The packet data unit area 604 may include a header area 612, an advertiser address area 614, and a payload area 616.

The header area 612 may include header information of the BLE advertising packet. The header information included in the header area 612 may be different from header information of the transmission message. The header area 612 may include a txAdd area 622 including a value according to a BLE advertising communication mode and a payload length area 624 representing a length of the payload area. The txAdd area 622 may have a size of 1 bit and the payload length area 624 may have a size of 6 bit. The header area 612 may have a limited size of 2 bytes.

The advertiser address area 614 may include address information of the advertiser device. According to an embodiment of the disclosure, the address information of the advertiser device may include a Mac address of the first home appliance 100. The advertiser address area 614 may include a limited size of 6 bytes.

The payload area 616 may be an area which a service provider may use. The payload area 616 may have a limited size of 31 bytes. The first home appliance 100 may insert header information of the transmission message into the payload area 616.

Figure 7:
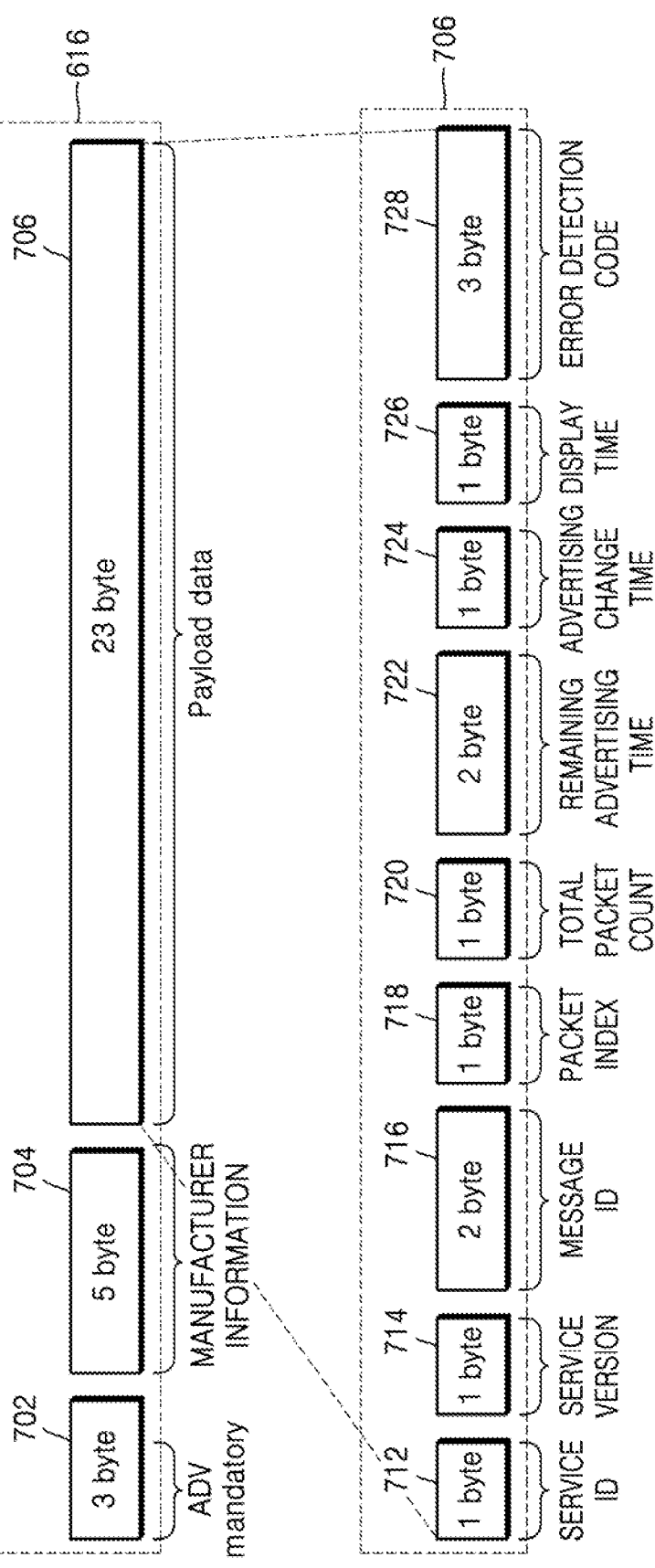
FIG. 7 is a diagram illustrating a structure of a payload area of a packet data unit of a BLE advertising packet according to an embodiment of the disclosure.

FIG. 7 is a diagram illustrating a structure of a payload area of a packet data unit of a BLE advertising packet according to an embodiment of the disclosure.

The payload area 616 of the BLE advertising packet 600 according to an embodiment of the disclosure may include an advertising mandatory area 702, a manufacturer information area 704, and a payload data area 706. According to an embodiment of the disclosure, the payload area 616 may have a limited size of 31 bytes.

Essential information defined in the BLE advertising communication standard may be inserted in the advertising mandatory area 702. According to an embodiment of the disclosure, the advertising mandatory area 702 may have a limited size of 3 bytes.

The manufacturer information of the first home appliance 100 may be inserted in the manufacturer information area 704. Each manufacturer may have a certain preallocated ID and such preallocated manufacturer ID may be inserted in the manufacturer information area 704. According to an embodiment of the disclosure, the manufacturer information area 704 may have a limited size of 5 bytes.

The header information of the transmission message may be inserted in the payload data area 706. The first home appliance 100 may generate header information of the transmission message corresponding to each BLE advertising packet 600. The first home appliance 100 may insert the generated header information of the transmission message in the payload data area 706. According to an embodiment of the disclosure, the payload data area 706 may have a limited size of 23 bytes.

According to an embodiment of the disclosure, the payload data area 706 may include a service ID area 712, a service version area 714, a message ID area 716, a packet index area 718, a total packet count area 720, a remaining advertising time area 722, an advertising change time area 724, a display time area 726, and an error detection code area 728. The service ID information may be inserted in the service ID area 712. The service version information may be inserted in the service version area 714. The message ID information may be inserted in the message ID area 716. The packet index information may be inserted in the packet index area 718. The total packet count information may be inserted in the total packet count area 720. The remaining advertising time information may be inserted in the remaining advertising time area 722. The advertising change time information may be inserted in the advertising change time area 724. The display time information may be inserted in the display time area 726. The error detection code may be inserted in the error detection code area 728.

The service ID information may be an ID corresponding to a message transmission service using the BLE advertising among home appliances. The service ID may be predefined based on a manufacturer or a certain standard. The first home appliance 100 may insert the service ID corresponding to a message transmission service using the BLE advertising in the header information. The service ID area 712 may have a limited size of 1 bytes.

The service version information may be version information of a service corresponding to a service ID. The service version area 714 may have a limited size of 1 bytes.

The message ID may be an ID corresponding to a transmission message. When a transmission message is generated, the first home appliance 100 may allocate a certain ID to the generated transmission message. The message ID area 716 may have a limited size of 2 bytes.

The packet index information may represent index information of a sub-transmission message inserted in a scan response data packet corresponding to the BLE advertising packet 600. The packet index area 718 may have a limited size of 1 byte.

The total packet count information may represent the number of sub-transmission message corresponding to the transmission message. The total packet count area 720 may have a limited size of 1 byte.

The remaining advertising time information may represent remaining time in effective time for a transmission operation of the transmission message. The first home appliance 100 may update the remaining advertising time information every time a BLE advertising packet is transmitted and insert the remaining advertising time information in the BLE advertising packet. The remaining advertising time area 722 may have a limited size of 2 bytes.

The advertising change time information may represent a change cycle of a pair of BLE advertising packet 600 and scan response data packet. A pair of BLE advertising packet 600 and scan response data packet may be transmitted within advertising change time, and the next pair of BLE advertising packet 600 and scan response data packet may be transmitted within the next advertising change time. The advertising change time area 724 may have a limited size of 1 byte.

The display time information may represent a length of time during which output of a transmission message is maintained in a home appliance which has received the transmission message. The display time area 726 may have a limited size of 1 byte.

The error detection code information may include CRC information of the transmission message. The error detection code area 728 may have a limited size of 3 bytes.

Figure 8:
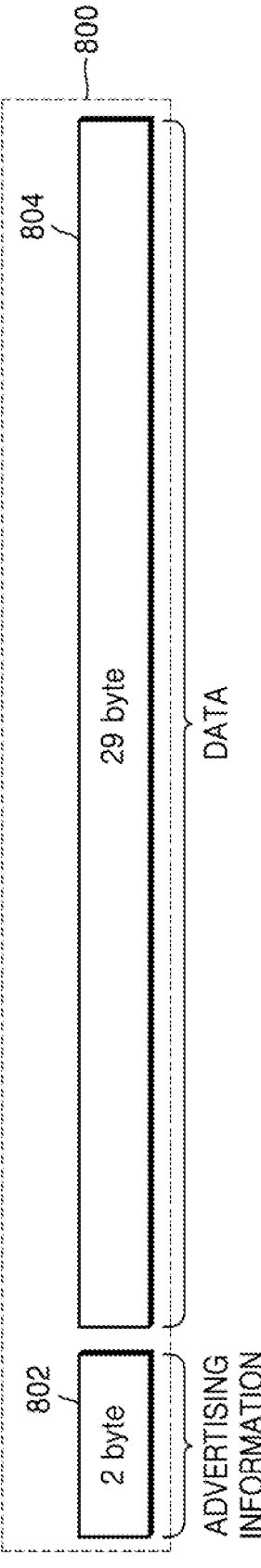
FIG. 8 is a diagram illustrating a structure of a scan response data packet according to an embodiment of the disclosure.

FIG. 8 is a diagram illustrating a structure of a scan response data packet according to an embodiment of the disclosure.

According to an embodiment of the disclosure, a scan response data packet 800 may include an advertising information area 802 and a data area 804. Certain meta information may be inserted in the advertising information area 802. The sub-transmission message may be inserted in the data area 804.

The data area 804 may include data encoded by using the universal coded character set+ transformation format—8-bit (UTF-8) method. The first home appliance 100 may encode the sub-transmission message by the UTF-8 encoding method and insert the encoded sub-transmission message in the data area 804.

FIG. 9 is a diagram illustrating a process of generating a transmission message and a sub-transmission message according to an embodiment of the disclosure.

According to an embodiment of the disclosure, when a notification event occurs, the first home appliance 100 may generate a transmission message 902 corresponding to the notification event. The first home appliance 100 may generate the transmission message 902 in a format predetermined according to each notification event. The first home appliance 100 may use predetermined information to generate a phrase, an insert value, a format, etc. of a transmission message corresponding to each notification event. For example, assuming that the first home appliance 100 is a washing machine, the first home appliance 100 may generate a transmission message 902 "Washing completed. Dry laundry using a dryer" when the washing is completed.

The first home appliance 100 may determine how many sub-transmission messages to generate. For example, the first home appliance 100 may determine into what number of sub-transmission messages the transmission message is to be divided based on a size of the transmission message 902. The first home appliance 100 may divide the transmission message 902 such that each sub-transmission message has a size less than or equal to a predetermined limited length. For example, the first home appliance 100 may divide the transmission message 902 such that each sub-transmission message has a size less than or equal to 29 bytes. When the size of the transmission message 902 is less than the predetermined limited length, a single sub-transmission message may be generated, or in an embodiment of the disclosure, the transmission message may be used as the sub-transmission message.

When the number of sub-transmission message is determined, the first home appliance 100 may generate total packet count information 904. For example, the first home appliance 100 may determine to divide the transmission message 902 into two sub-transmission messages and define the total packet count information 904 as 2.

In an embodiment of the disclosure, when the number of sub-transmission message is determined, the first home appliance 100 may generate sub-transmission messages equal to the number. The first home appliance 100 in the example of FIG. 9 may generate a first sub-transmission message 912a and a second sub-transmission message 912b by dividing the transmission message 902. The first home appliance 100 may generate first packet index information

914a and second packet index information 914b with respect to each of the first and second sub-transmission messages 912a and 912b. The first and second packet index information 914a and 914b may be assigned according to the order of the first and second sub-transmission messages 912a and 912b.

Figure 10:
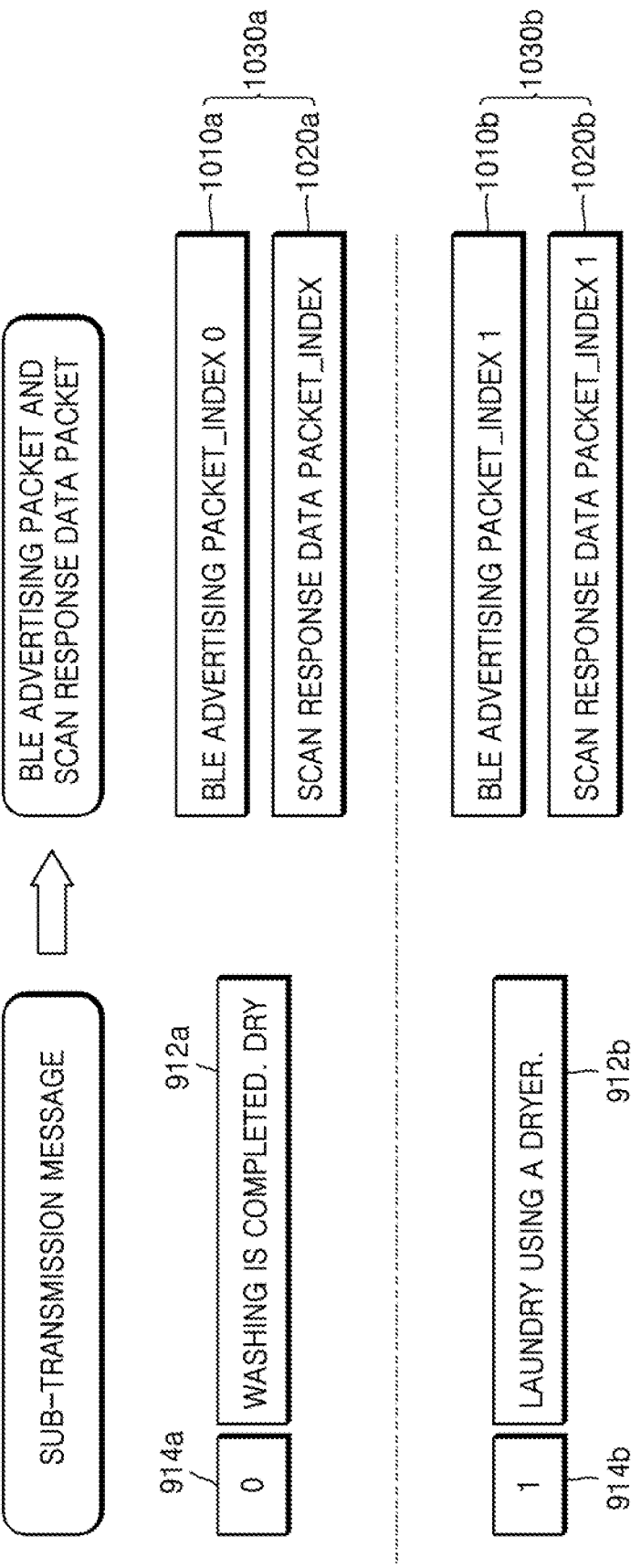
FIG. 10 is a diagram illustrating a process of generating a BLE advertising packet and a scan response data packet, according to an embodiment of the disclosure.

FIG. 10 is a diagram illustrating a process of generating a BLE advertising packet and a scan response data packet according to an embodiment of the disclosure.

According to an embodiment of the disclosure, the first home appliance 100 may generate a packet pair 1030a and 1030b with respect to each sub-transmission message 912a and 912b. A first packet pair 1030a may be generated with respect to a first sub-transmission message 912a and a second packet pair 1030b may be generated with respect to a second sub-transmission message 912b.

The first packet pair 1030a may include a first BLE advertising packet 1010a and a first scan response data packet 1020a. The first BLE advertising packet 1010a may include first header information corresponding to the first sub-transmission message 912a. The first scan response data packet 1020a may include the first sub-transmission message 912a.

The second packet pair 1030b may include a second BLE advertising packet 1010b and a second scan response data packet 1020b. The second BLE advertising packet 1010b may include second header information corresponding to the second sub-transmission message 912b. The second scan response data packet 1020b may include the second sub-transmission message 912b.

FIG. 11 is a diagram illustrating header information of a transmission message according to an embodiment of the disclosure.

According to an embodiment of the disclosure, the first home appliance 100 may generate header information corresponding to each sub-transmission message. For at least one sub-transmission message corresponding to the same transmission message, a service ID, service version information, a message ID, total packet count information, advertising change time information, display time information, and error detection code information may be set equally among the sub-transmission messages. The packet index information and the remaining advertising time information in the header information may be set individually for each packet pair 1030a and 1030b. The first home appliance 100 may update the packet index information and the remaining advertising time information every time each packet pair 1030a and 1030b is generated.

Figure 12:
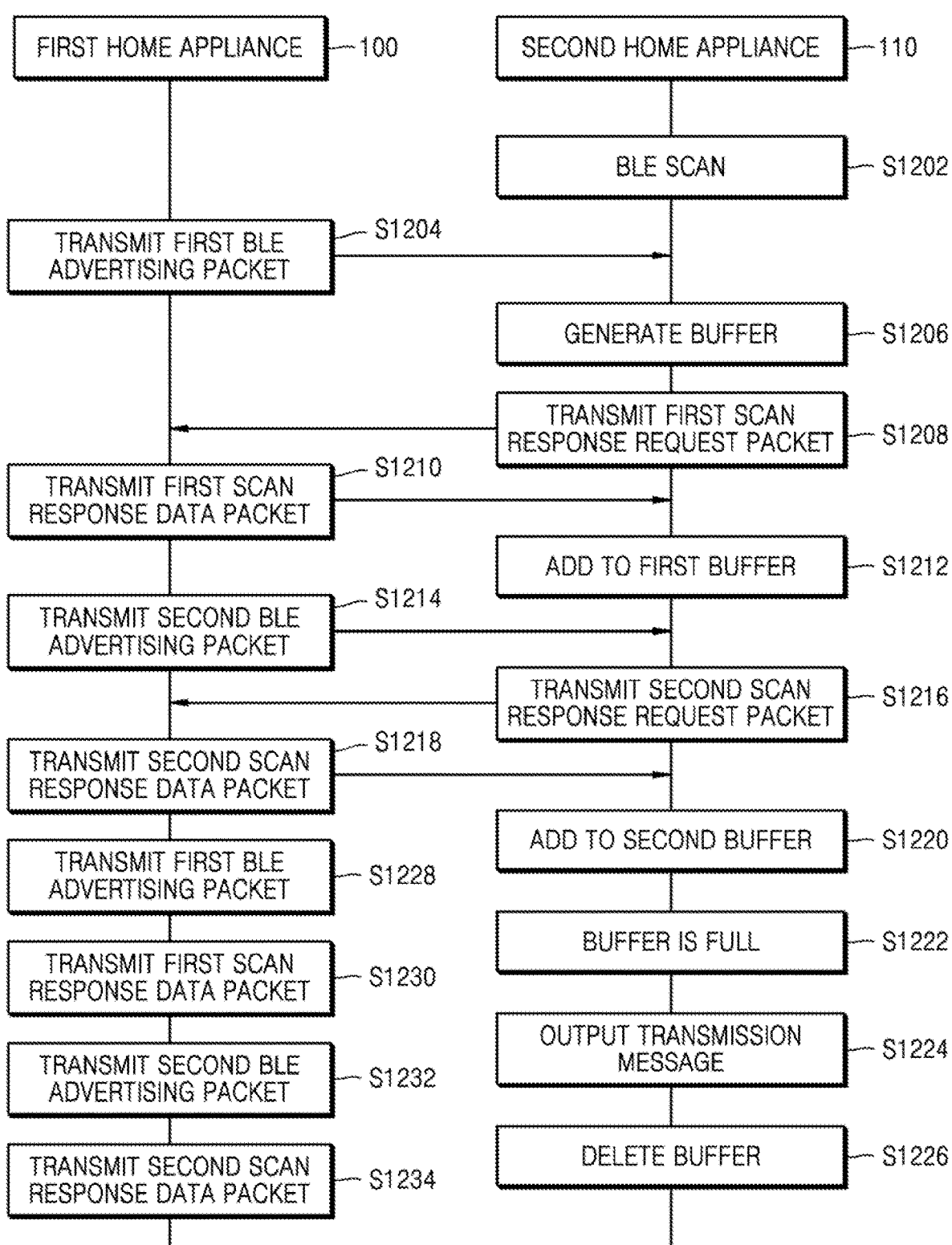
FIG. 12 is a diagram illustrating a process of transmitting a BLE advertising packet and a scan response data packet by a first home appliance and processing a received packet by a second home appliance, according to an embodiment of the disclosure.

FIG. 12 is a diagram illustrating a process of transmitting a BLE advertising packet and a scan response data packet by a first home appliance and processing a received packet by a second home appliance according to an embodiment of the disclosure.

FIG. 12 illustrate the case where the transmission message has a total packet count of 2. The process of transmitting the BLE advertising packet and the scan response data packet and the process of processing the received packet by the second home appliance may be properly changed according to the total packet count number.

In operation S1202, the second home appliance 110 may perform a BLE scan. The point of initiating the BLE scan may be determined according to a BLE scan cycle of the second home appliance 110. Accordingly, the point of initiating the BLE scan by the second home appliance 110 may be determined independently from an operation of the first home appliance 100.

In operation S1204, the first home appliance 100 may transmit a first BLE advertising packet including header information of the transmission message. The second home appliance 110 may receive the first BLE advertising packet while performing the BLE scan.

Next, in operation S1206, the second home appliance 110 may generate a buffer based on the header information of the transmission message. The second home appliance 110 may determine a size of the buffer based on the total packet count number information of the transmission message to generate the buffer.

Then, in operation S1208, the second home appliance 110 may transmit a first scan response request packet.

In operation S1210, the first home appliance 100 may transmit a first scan response data packet including a first sub-transmission message in response to the first scan response request packet.

In operation 1212, the second home appliance 110 may add the first sub-transmission message of the first scan response data packet to a first buffer.

The first home appliance 100 may transmit a second BLE advertising packet in operation S1214. The second home appliance 110 may transmit a second scan response request packet in operation S1216. The first home appliance 100 may transmit a second scan response data packet in response to the second scan response request packet in operation S1218. In operation S1220, the second home appliance 110 may add a first sub-transmission message included in the second scan response data packet to a second buffer.

In operation S1222, the second home appliance 110 may detect that the buffer is full. In operation S1224, the second home appliance 110 may generate a transmission message by combining the sub-transmission messages stored in the buffer and output the transmission message. In operation S1226, the second home appliance 110 may delete the sub-transmission messages stored in the buffer after the transmission message is output.

The first home appliance 100 may iterate the transmission of the transmission message a certain number of times. Since the first home appliance 100 does not know whether the transmission message is received by the second home appliance 110, the transmission process of the transmission message may be repeated regardless of whether the second home appliance 110 receives the transmission message. Accordingly, the first home appliance 100 may transmit the first BLE advertising packet in operation S1228, and transmit the first scan response data packet in operation S1230. In an embodiment of the disclosure, the first home appliance 100 may transmit the second BLE advertising packet in operation S1232 and transmit the second scan response data packet in operation S1234.

Figure 13:
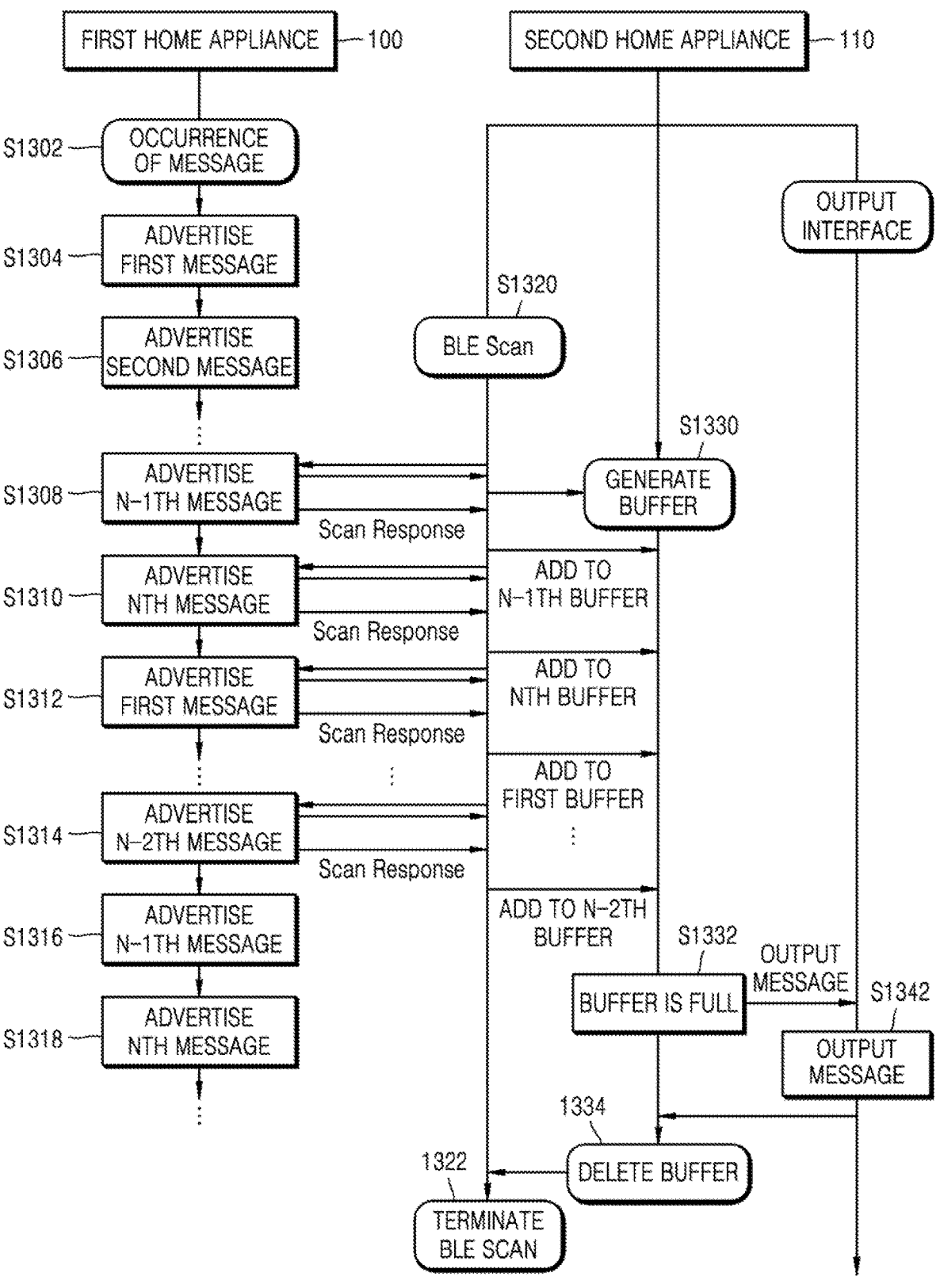
FIG. 13 is a diagram illustrating a process of transmitting a transmission message by a first home appliance and receiving a transmission message by a second home appliance, according to an embodiment of the disclosure.

FIG. 13 is a diagram illustrating a process of transmitting a transmission message by a first home appliance and receiving a transmission message by a second home appliance according to an embodiment of the disclosure.

FIG. 13 is a flowchart illustrating the case where the transmission message is divided into N sub-transmission messages (N is a natural number) according to an embodiment of the disclosure.

The first home appliance 100 may divide the transmission message into N sub-transmission messages in operation S1302.

Next, the first home appliance 100 may perform an advertising operation of a first sub-transmission message in operation S1304. The advertising operation may refer to an operation of transmitting the BLE advertising packet by the first home appliance 100. The first home appliance 100 may sequentially perform the advertising operation of the message in operations S1304 and S1306 regardless of whether the second home appliance 110 performs BLE scan.

When the second home appliance 110 initiates the BLE scan in operation S1320 during the advertising operation by the first home appliance 100, the second home appliance 110 may receive the BLE advertising packet from the point of initiating the BLE scan. For example, the second home appliance 110 may initiate the BLE scan before the first home appliance 100 performs the advertising operation of an N−1th sub-transmission message in operation S1308 as illustrated in FIG. 13, and the second home appliance 110 may first receive the BLE advertising packet of the N−1th sub-transmission message.

The second home appliance 110 may transmit a scan response request packet in correspondence to the BLE advertising packet of the first received N−1th sub-transmission message. In operation S1308, the first home appliance 100 may transmit a scan response data packet including the N−1th sub-transmission message in response to the received scan response request packet.

In operation S1330, the second home appliance 110 may generate a buffer based on header information of the transmission message included in the BLE advertising packet of the N−1th sub-transmission message. The second home appliance 110 may determine a size of the buffer based on total packet count information of the header information to generate the buffer. The second home appliance 110 may extract the sub-transmission message from the scan response data packet and store the extracted sub-transmission message in the buffer based on the packet index information.

The first home appliance 100 may sequentially perform the advertising operation of the sub-transmission message in operations S1310, S1312, S1314, S1316, and S1318. When the scan response data packet is received, the second home appliance 110 may add the sub-transmission message included in the received scan response data packet to a corresponding buffer. As the second home appliance 110 has first received the N−1th sub-transmission message among N sub-transmission messages, the second home appliance 110 may later receive a Nth sub-transmission message, and then sequentially receive first to the N−1th sub-transmission messages.

The first home appliance 100 may repetitively perform the BLE advertising operation in operations S1316 and S1318 during the effective time for the BLE advertising operation regardless of completion of receipt of the transmission message by the second home appliance 110.

When the buffer is full, the second home appliance 110 may generate a transmission message from the sub-transmission message stored in the buffer in operation S1332. The second home appliance 110 may output the transmission message through the output interface in operation S1342. The second home appliance 110 ay output the transmission message during the time corresponding to the display time information of the header information of the transmission message.

When the output of the transmission message is completed, the second home appliance 110 may delete the transmission message stored in the buffer in operation S1334.

In an embodiment of the disclosure, when certain BLE scan time is terminated, the second home appliance 110 may terminate the BLE scan in operation S1322.

According to an embodiment of the disclosure, the second home appliance 110 may adjust the BLE scan time based on the remaining advertising time information included in the header information of the transmission message. The BLE scan time may be conducted during a certain section per a certain cycle in the second home appliance 110 regardless of the advertising operation of the transmission message by the first home appliance 100. According to an embodiment of the disclosure, when the remaining BLE scan time at the time when the second home appliance 110 performs the BLE scan and first receives the BLE advertising packet of the first home appliance 100 is shorter than the remaining advertising time of the transmission message, the second home appliance 110 may extend the BLE scan time to the remaining advertising time.

According to an embodiment of the disclosure, when the second home appliance 110 performs the BLE scan and receives the BLE advertising packet of the first home appliance 100, the second home appliance 110 may maintain the BLE scan operation until the receipt of the transmission message is completed. Accordingly, the second home appliance 110 may perform the BLE scan operation over a preset BLE scan section until the receipt of the transmission message is completed.

In an embodiment of the disclosure, according to an embodiment of the disclosure, the second home appliance 110 may set a BLE scan cycle based on the advertising change time information. The second home appliance 110 may set the BLE scan cycle to be shorter than or equal to the advertising change time.

Figure 14:
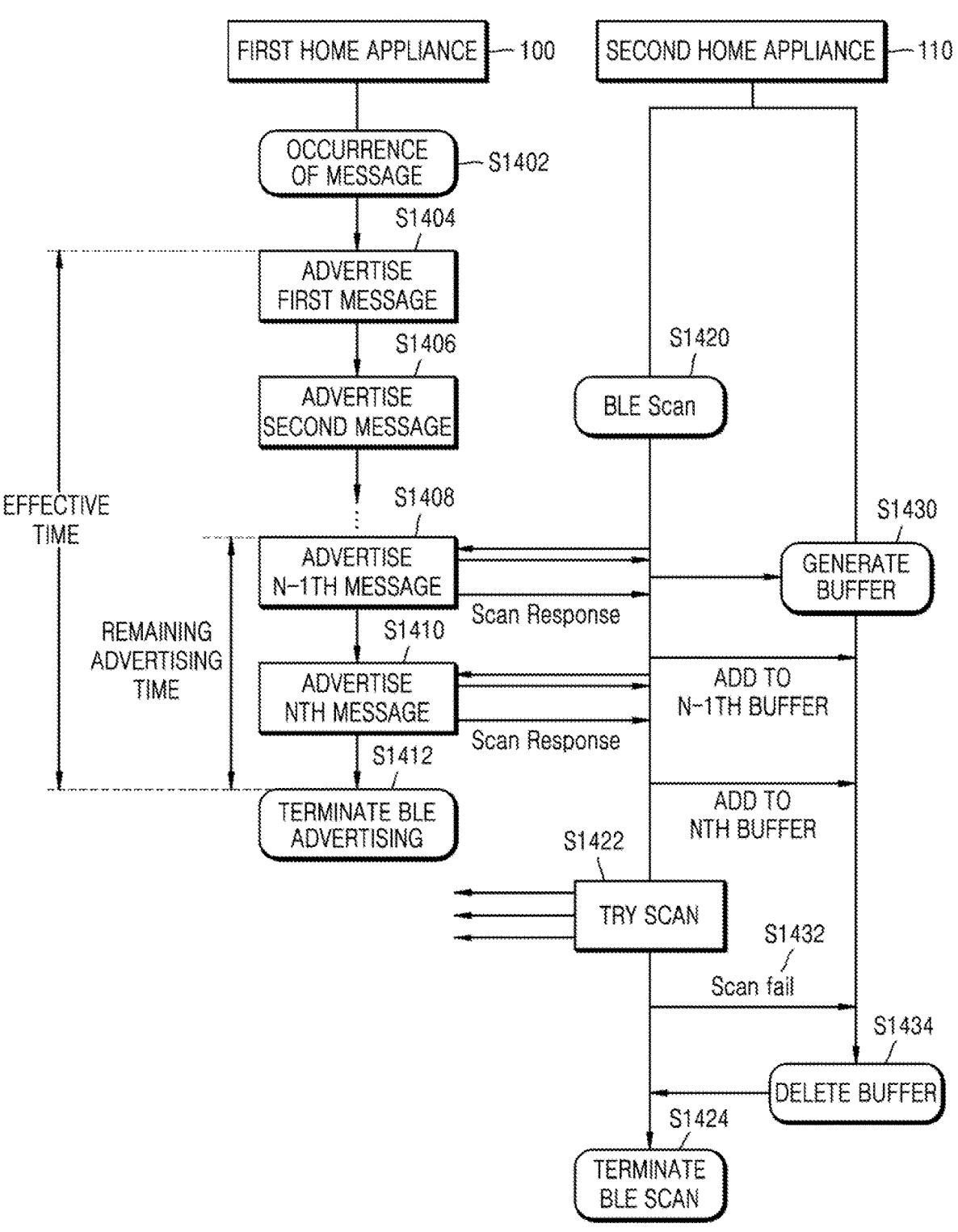
FIG. 14 is a diagram illustrating a failure to receive a transmission message in a second home appliance, according to an embodiment of the disclosure.

FIG. 14 is a diagram illustrating failure to receive a transmission message in a second home appliance according to an embodiment of the disclosure.

FIG. 14 is a flowchart illustrating the case where the transmission message is divided into N sub-transmission messages (N is a natural number) according to an embodiment of the disclosure.

According to an embodiment of the disclosure, when transmitting a transmission message, the first home appliance 100 may set an effective time for the transmission operation. As the first home appliance 100 does not receive feedbacks regarding the information about an observer device receiving the transmission message, the first home appliance 100 may not know whether the transmission message is successfully received by the observer device. According to an embodiment of the disclosure, the first home appliance 100 may set an effective time for transmission of the transmission message to prevent excessive repetition of the BLE advertising operation.

The remaining advertising time may refer to a remaining time at the time of transmission of the BLE advertising packet. For example, the remaining advertising time of the BLE advertising packet transmitted in operation S1408 may be defined as illustrated in FIG. 14.

The first home appliance 100 may divide the transmission message into N sub-transmission messages in operation S1402.

Next, the first home appliance 100 may perform an advertising operation of a first sub-transmission message in operation S1404. The first home appliance 100 may sequentially perform the advertising operation of the message in operations S1404 and S1406 regardless of whether the second home appliance 110 performs BLE scan.

When the second home appliance 110 initiates the BLE scan in operation S1420 during the advertising operation by the first home appliance 100, the second home appliance 110 may receive the BLE advertising packet from the point of initiating the BLE scan. For example, the second home appliance 110 may initiate the BLE scan before the first home appliance 100 performs the advertising operation of an N−1th sub-transmission message in operation S1408 as illustrated in FIG. 14, and the second home appliance 110 may first receive the BLE advertising packet of the N−1th sub-transmission message.

The second home appliance 110 may transmit a scan response request packet in correspondence to the BLE advertising packet of the first received N−1th sub-transmission message. In operation S1408, the first home appliance 100 may transmit a scan response data packet including the N−1th sub-transmission message in response to the received scan response request packet.

Then, the BLE advertising operation of the Nth sub-transmission message may be performed sequentially in operation S1410.

In operation S1430, the second home appliance 110 may generate a buffer based on header information of the transmission message included in the BLE advertising packet of the N−1th sub-transmission message. The second home appliance 110 may determine a size of the buffer based on total packet count information of the header information to generate the buffer. The second home appliance 110 may extract the sub-transmission message from the scan response data packet and store the extracted sub-transmission message in the buffer based on the packet index information.

When the BLE advertising operation by the first home appliance 100 is terminated in operation S1412 before the second home appliance 110 receives all sub-transmission messages after initiating the BLE scan (S1420), the second home appliance 110 may fail to receive the transmission message. When the second home appliance 110 tries the BLE scan in S1422 and fails more than a certain number of times, the second home appliance 110 may identify failure of scan in operation S1432. In case of failure of scan, the second home appliance 110 may delete the sub-transmission message stored in the buffer in operation S1434.

When the BLE scan time is terminated, the second home appliance 110 may terminate the BLE scan in operation S1424.

Figure 15:
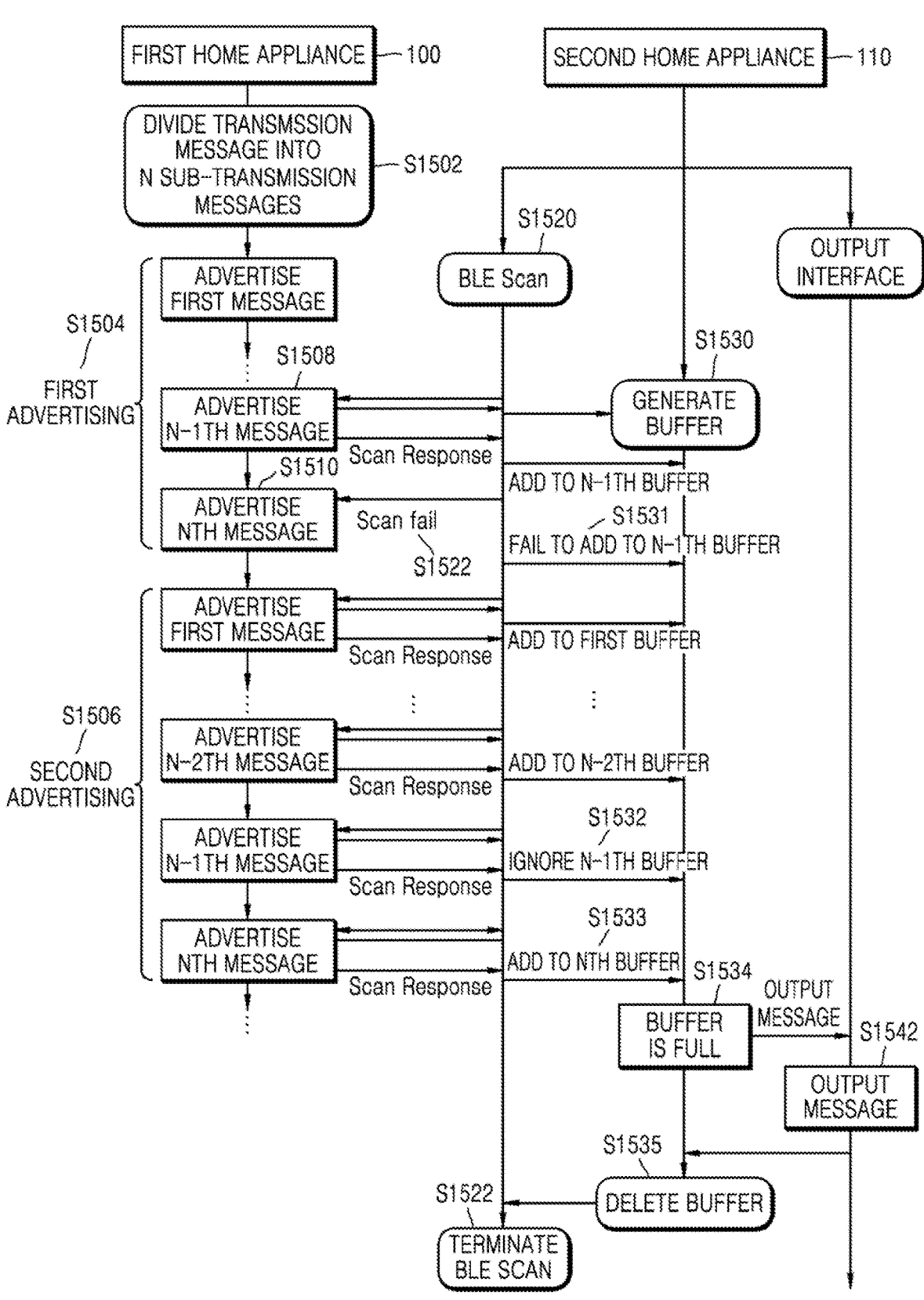
FIG. 15 is a diagram illustrating a process of performing a BLE advertising operation by a first home appliance multiple times, according to an embodiment of the disclosure.

FIG. 15 is a diagram illustrating a process of performing a BLE advertising operation by a first home appliance multiple times according to an embodiment of the disclosure.

According to an embodiment of the disclosure, the first home appliance 100 may perform the BLE advertising operation multiple times. As the first home appliance 100 performs the BLE advertising operation multiple times, the probability of success in transmitting the transmission message by the BLE advertising may be increased.

The number of repetition of transmitting the transmission message by the first home appliance 100 may be determined according to an embodiment of the disclosure. For example, the first home appliance 100 may repeat the transmission of the transmission message two times.

The first home appliance 100 may divide the transmission message into N sub-transmission messages in operation S1502.

The first home appliance 100 may transmit the transmission message two times. The first home appliance 100 may perform first advertising in operation S1504 and perform second advertising in operation S1506. During a section of each of the first advertising and the second advertising, the first home appliance 100 may perform the advertising operation of the first to Nth sub-transmission messages.

When the second home appliance 110 initiates the BLE scan in operation S1520 during the advertising operation by the first home appliance 100, the second home appliance 110 may receive the BLE advertising packet from the point of initiating the BLE scan. For example, the second home appliance 110 may initiate the BLE scan before the first home appliance 100 performs the advertising operation of an N−1th sub-transmission message in operation S1508 as illustrated in FIG. 15, and the second home appliance 110 may first receive the BLE advertising packet of the N−1th sub-transmission message.

The second home appliance 110 may transmit a scan response request packet in correspondence to the BLE advertising packet of the first received N−1th sub-transmission message. In operation S1508, the first home appliance 100 may transmit a scan response data packet including the N−1th sub-transmission message in response to the received scan response request packet.

Then, the BLE advertising operation of the Nth sub-transmission message may be performed sequentially in operation S1510.

In operation S1530, the second home appliance 110 may generate a buffer based on header information of the transmission message included in the BLE advertising packet of the N−1th sub-transmission message. The second home appliance 110 may determine a size of the buffer based on total packet count information of the header information to generate the buffer. The second home appliance 110 may extract the sub-transmission message from the scan response data packet and store the extracted sub-transmission message in the buffer based on the packet index information.

The second home appliance 110 may fail to receive a packet during performing the BLE scan due to various causes. For example, the first home appliance 100 may transmit an Nth sub-transmission message in operation S1510, and the second home appliance 110 may fail to receive the BLE advertising packet or the scan response data packet that corresponds to the Nth sub-transmission message (S1522). In this case, the second home appliance 110 may fail to add the Nth sub-transmission message to an Nth buffer (S1513). Since the first home appliance 100 does not know that the second home appliance 110 has failed to receive the Nth sub-transmission message, the first home appliance 100 may sequentially perform the next BLE advertising operation.

When the first home appliance 100 transmits the transmission message two times, the first home appliance 100 may perform the first advertising operation of the Nth sub-transmission message in operation S1510 and then perform the second advertising operation (S1506). As such, the first home appliance 100 may once again perform the advertising operation of the sub-transmission message after the advertising operation of the Nth sub-transmission message in operation S1510. As the second home appliance 110 started the BLE scan during the first advertising, the second home appliance 110 may receive a sub-transmission message transmitted by the second advertising and store the same in the buffer. The second home appliance 110 may additionally perform the operation of receiving the sub-transmission message and storing the same in the buffer until the buffer is full.

As described above, when the second home appliance 110 has failed to receive some sub-transmission messages during the first advertising (S1504), the second home appliance 110 may receive during the second advertising (S1506) the sub-transmission messages which the second home appliance 110 has failed to receive during the first advertising (S1504). For example, the second home appliance 110 may receive during the second advertising (S1506) operation an Nth sub-transmission message that the second home appliance 110 has failed to receive during the previous first advertising (S1504) operation. In this case, the second home appliance 110 may omit the operation of storing a sub-transmission message in a buffer when a sub-transmission message already stored in the buffer is received to receive a sub-transmission message omitted in subsequent repetitive advertising operations. For example, in operation S1532, when an N−1th sub-transmission message already stored in the buffer is received, the second home appliance 110 may omit the operation of storing the N−1th sub-transmission message in the buffer. When the Nth sub-transmission message which the second home appliance 110 has failed to receive previously, the second home appliance 110 may store the Nth sub-transmission message in the buffer in operation S1533.

The first home appliance 100 may repetitively perform the BLE advertising operation during the effective time for the BLE advertising operation regardless of completion of receipt of the transmission message by the second home appliance 110. The first home appliance 100 may perform the operation of advertising the transmission message a predetermined number of times.

When the buffer is full, the second home appliance 110 may generate a transmission message from the sub-transmission message stored in the buffer in operation S1534. The second home appliance 110 may output the transmission message through the output interface in operation S1542. The second home appliance 110 ay output the transmission message during the time corresponding to the display time information of the header information of the transmission message.

When the output of the transmission message is completed, the second home appliance 110 may delete the transmission message stored in the buffer in operation S1535.

In an embodiment of the disclosure, when certain BLE scan time is terminated, the second home appliance 110 may terminate the BLE scan in operation S1522.

Figure 16:
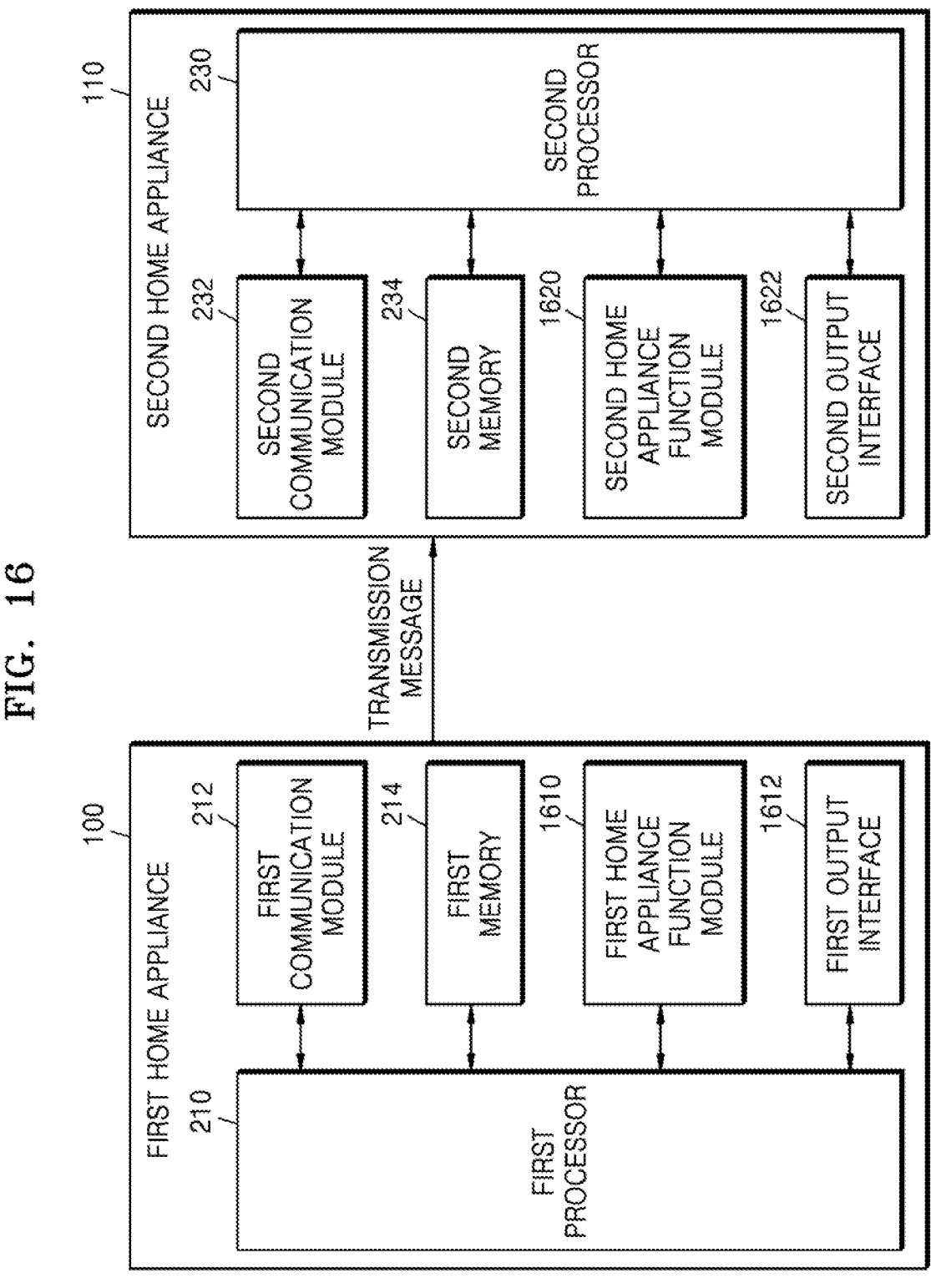
FIG. 16 is a block diagram illustrating structures of a first home appliance and a second home appliance, according to an embodiment of the disclosure.

FIG. 16 is a block diagram illustrating structures of a first home appliance and a second home appliance according to an embodiment of the disclosure.

According to an embodiment of the disclosure, the first home appliance 100 may include a first home appliance function module 1610. The first home appliance 100 may include the first home appliance function module 1610 which performs original functions of home appliances. The first home appliance 100 may detect a notification event related to the first home appliance function module 1610 and generate a transmission message with respect to the notification event. The first home appliance 100 may broadcast the transmission message through the BLE advertising and transmit the transmission message to a peripheral device capable of BLE communication.

The second home appliance 110 may be arranged within a certain distance from the first home appliance 100 and may be a home appliance capable of BLE communication. The second home appliance 110 may include a second home appliance function module 1620 which performs original functions of home appliances. The second home appliance 110 may receive a transmission message transmitted by the BLE advertising operation from the first home appliance 100.

The second home appliance 110 may detect a notification event related to the second home appliance function module 1620 and generate a transmission message with respect to the notification event. The second home appliance 110 may broadcast the transmission message through the BLE advertising and transmit the transmission message to a peripheral device capable of BLE communication. The first home appliance 100 may perform the BLE scan, receive a transmission message transmitted through the BLE advertising from the second home appliance 110, and output the transmission message through a first output interface 1612.

The first home appliance 100 may include the first processor 210, the first communication module 212, the first memory 214, the first home appliance function module 1610, and the first output interface 1612. As the first processor 210, the first communication module 212, and the first memory 214 are as described above with reference to FIG. 2, the first home appliance function module 1610 and the first output interface 1612 are described below with reference to FIG. 16.

The first home appliance function module 1610 may include an operation module configured to perform original functions of the first home appliance 100. When the first home appliance 100 is a washing machine, the first home appliance function module 1610 may include a washing module. The washing module may include a washing tub, a water supply portion, a water drainage portion, a motor, a door, a detergent inlet, etc. When the first home appliance 100 is a refrigerator, the first home appliance function module 1610 may include a refrigerating/freezing module. The refrigerating/freezing module may include a container, a cooler, a door, a temperature sensor, etc. When the first home appliance 100 is a dryer, the first home appliance function module 1610 may include a drying module. The drying module may include a laundry container, a motor, a dehumidifying portion, a water drainage portion, a door, a dust filter, a condenser, etc. When the first home appliance 100 is a cleaner, the first home appliance function module 1610 may include a cleaning module. The cleaning module may include a vacuum dust absorbing portion, a dust container, a filter, a dust passage pipe, etc.

The first home appliance 100 may collect status information or operation information of the first home appliance function module 1610.

The status information may include information about failure, error, door open/close status, etc. of the first home appliance function module 1610. When the first home appliance 100 is a washing machine, the status information may include a water supply error, a water drainage error, a door open/close status, etc. When the first home appliance 100 is a dryer, the status information may include a dust container status, a door open/close status, etc. When the first home appliance 100 is a refrigerator, the status information may include door open information, temperature information, power supply status, etc. When the first home appliance 100 is a shoes caring device, the status information may include a door open/close status, etc. When the first home appliance 100 is a robot cleaner, the status information may include a dust container status, a sensor status, a water container mount status, a damp cloth mount status, a cleaning brush status, remaining battery, a communication status, etc.

The operation information may include whether the first home appliance function module 1610 is being operated, information about operation modes, etc. When the first home appliance 100 is a washing machine, the operation information may include information about whether the washing is in progress, information about washing course (e.g., a standard mode, a color mode, a functional clothing mode, a bedclothes mode, and a wool mode), etc. When the first home appliance 100 is a dryer, the operation information may include information about whether the drying is in progress, information about drying course (e.g., a standard mode, a color mode, and a functional clothing mode), etc.

When the first home appliance 100 is a shoes caring device, the operation information may include information about whether the shoes caring is in progress, information about shoes caring mode (e.g., a standard mode and a dehumidifying mode), etc. When the first home appliance 100 is a robot cleaner, the operation information may include whether the cleaning is in progress, information about cleaning mode (e.g., a vacuum cleaning mode, a damp cloth cleaning mode, etc.), a position of the robot cleaner on a map, etc.

The first processor 210 may generate a notification event based on at least one of status information or operation information of the first home appliance function module 1610 or a combination thereof. When a notification event is generated, the first processor 210 may transmit a transmission message corresponding to the notification event through the BLE advertising operation.

The first output interface 1612 may output operation information, status information, a message, guide information, etc. of the first home appliance 100. The first output interface 1612 may output the transmission message received from the second home appliance 110. The first output interface 1612 may include, for example, a display, a speaker, a LED, etc.

The first home appliance 100 may perform the BLE scan and receive a BLE advertising packet and a scan response data packet during the BLE scan to obtain a transmission message transmitted from other home appliances. The first communication module 212 may perform the BLE scan during a certain time period. The first processor 210 may generate a buffer based on the received BLE advertising packet. The first processor 210 may obtain a sub-transmission message from the scan response data packet and store the sub-transmission message in the buffer. When the buffer is full, the first processor 210 may output the transmission message through the first output interface 1612 and delete the buffer.

Similar to the operation of receiving a transmission message by the second home appliance 110, the first home appliance 100 may receive and output a transmitted message through the BLE advertising.

The second home appliance 110 may include a second processor 230, a second communication module 232, a second memory 234, a second home appliance function module 1620, and a second output interface 1622. The second processor 230, the second communication module 232, and the second memory 234 may be as described with reference to FIG. 2. The second output interface 1622 may correspond to the output interface 112 described above. A second home appliance function module 1630 is described with reference to FIG. 16.

The second home appliance function module 1620 may include an operation module configured to perform original functions of the second home appliance 110. When the second home appliance 110 is a washing machine, the second home appliance function module 1620 may include a washing module. When the second home appliance 110 is a refrigerator, the second home appliance function module 1620 may include a refrigerating/freezing module. When the second home appliance 110 is a dryer, the second home appliance function module 1620 may include a drying module. When the second home appliance 110 is a cleaner, the second home appliance function module 1620 may include a cleaning module.

Similar to the operations described above in relation to the first home appliance 100, the second home appliance 110 may obtain operation information or status information of the second home appliance function module and generate a notification event. In an embodiment of the disclosure, similar to the operations described above in relation to the first home appliance 100, the second home appliance 110 may generate a transmission message corresponding to the notification event and transmit the transmission message through the BLE advertising operation.

Figure 17:
FIG. 17 is a diagram illustrating a notification event lookup table according to an embodiment of the disclosure.

FIG. 17 is a diagram illustrating a notification event lookup table according to an embodiment of the disclosure.

According to an embodiment of the disclosure, the first home appliance 100 may generate a notification event based on at least one of the operation information or the status information and generate a transmission message. The first home appliance 100 may store a notification event lookup table 1710 in the first memory 214. The first processor 210 may generate a notification event based on at least one of the operation information or the status information according to the notification event lookup table 1710.

The first processor 210 may obtain at least one of the operation information or the status information from the first home appliance function module 1610. When the operation information or the status information satisfies a condition for generation of a notification event, the first processor 210 may generate a notification event. The first processor 210 may generate at transmission message corresponding to the notification event based on the notification event lookup table.

Figure 18:
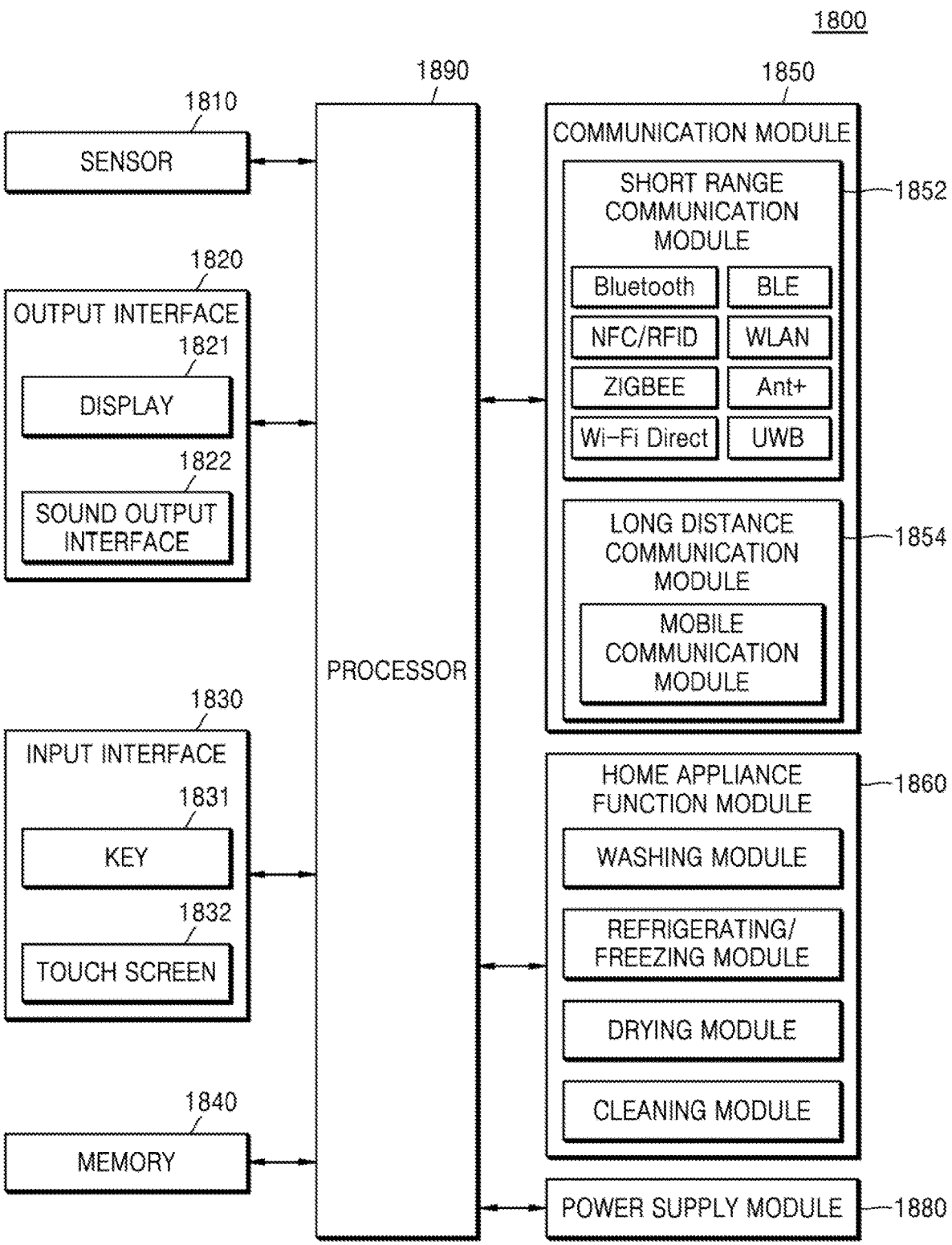
FIG. 18 is a block diagram illustrating a structure of a home appliance according to an embodiment of the disclosure.

FIG. 18 is a block diagram illustrating a structure of a home appliance according to an embodiment of the disclosure.

A home appliance 1800 illustrated in FIG. 18 may correspond to the first home appliance 100 or the second home appliance 110 described above. The home appliance 1800 according to an embodiment of the disclosure may include a sensor 1810, an output interface 1820, an input interface 1830, a memory 1840, a communication module 1850, a home appliance function module 1860, a power module 1880, and a processor 1890. The home appliance 1800 may include various combinations of components illustrated in FIG. 18; however, the components illustrated in FIG. 18 are not all essential.

An output interface 2120 of FIG. 18 may correspond to the output interface 112, the first output interface 1612, or the second output interface 1622. A memory 2140 of FIG. 18 may correspond to the first memory 214 or the second memory 234. A communication module 2150 of FIG. 18 may correspond to the first communication module 212 or the second communication module 232. A home appliance function module 2160 of FIG. 18 may correspond to the first home appliance function module 1610 or the second home appliance function module 1620. A processor 2190 of FIG. 18 may correspond to the first processor 210 or the second processor 230.

The sensor 1810 may include various types of sensor, for example, an image sensor, an infrared sensor, an ultrasonic sensor, a LiDar sensor, a human body detect sensor, a motion detect sensor, a proximity sensor, an illuminance sensor, etc. Because a function of each of sensors may be intuitively inferred by one of ordinary skill in the art from the name of the sensor, a detailed description thereof may be omitted.

The output interface 1820 may include a display 1821, a speaker 1822, etc. The output interface 1820 may output various notifications, messages, information, etc. generated from the processor 1890.

The input interface 1830 may include a key 1831, a touch screen 1832, etc. The input interface 1830 may receive a user input and transmit the user input to the processor 1890.

The memory 1840 may store various information, data, instructions, programs, etc. required for operations of the home appliance 1800. The memory 1840 may include at least one of a volatile memory or a non-volatile memory or a combination thereof. The memory 1840 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The home appliance 1800 may operate a web storage or a cloud server which performs a storage function on the internet.

The communication module 1850 may include a short range communication module 1852 or a long distance communication module 1854 or a combination thereof. The communication module 1850 may include at least one antenna for wireless communication with other devices.

The short range wireless communication module may include a Bluetooth communication module, a BLE communication module, a near field communication module, a WLAN (Wi-Fi) communication module, a zigbee communication module, an IrDA communication module, a WFD communication module, an UWB communication module, an Ant+ communication module, a microwave (uWave) communication module, etc.; however, the disclosure is not limited thereto.

The long distance communication module 1854 may include a communication module that performs various types of long distance communication, and may include a mobile communication module. The mobile communication module may receive and transmit a wireless signal from and to at least one of a base station, an external terminal, or a server on a mobile communication network. The wireless signal may include a voice call signal, a video call signal, or data in various forms according to receipt and transmission of text/multimedia message.

The home appliance function module 1860 may include an operation module configured to perform original functions of the home appliance 1800. When the home appliance 1800 is a washing machine, the home appliance function module 1860 may include a washing module. The washing module may include a washing tub, a water supply portion, a water drainage portion, a motor, a door, a detergent inlet, etc. When the home appliance 1800 is a refrigerator, the home appliance function module 1860 may include a refrigerating/freezing module. The refrigerating/freezing module may include a container, a cooler, a door, a temperature sensor, etc. When the home appliance 1800 is a dryer, the home appliance function module 1860 may include a drying module. The drying module may include a laundry container, a motor, a dehumidifying portion, a water drainage portion, a door, a dust filter, a condenser, etc. When the home appliance 1800 is a cleaner, the home appliance function module 1860 may include a cleaning module. The cleaning module may include a vacuum dust absorbing portion, a dust container, a filter, a dust passage pipe, etc.

The processor 1890 may control all operations of the home appliance 1800. The processor 1890 may execute a program stored in the memory 1840 to control components of the home appliance 1800.

According to an embodiment of the disclosure, the processor 1890 may include a separate neural processing unit (NPU) configured to perform operations of a machine learning model. The processor 1890 may include a central processing unit (CPU), a graphic processing unit (GPU), etc.

Various embodiments may be implemented as a software (e.g., a program) including at least one instruction stored in a storage medium which is readable by a machine (e.g., a mobile device or home appliance 100). For example, a processor of a machine (e.g., first home appliance 100 or second home appliance 110) may call and execute at least one instruction from among instructions stored in a storage medium. By doing so, the appliance is operated to perform at least one function according to the at least one called instruction. The at least one instruction may include a code generated by a compiler or a code executable by an interpreter. A machine-readable storage medium may be provided as a non-transitory storage medium. The term "non-transitory" only means that a storage medium is tangible and does not include a signal (e.g., an electromagnetic wave) and the term is not used to distinguish permanent storage of data in a storage medium from temporary storage of data.

According to an embodiment of the disclosure, a method according to various embodiments may be included and provided in a computer program product. The computer program product may be traded between a buyer and a seller as a commodity. The computer program product may be distributed in a form of a machine-readable compact disc read-only memory (CD-ROM) or via an application store (e.g., Play Store™) or distributed online (e.g., downloaded or uploaded) directly between two user devices (e.g., smartphones). In case of online distribution, at least part of the computer program product may be at least temporarily stored or generated in a machine-readable storage medium such as a server of a manufacturer, a server of an application store, or a memory of a relay server.

According to various embodiments, components (e.g., a module or a program) of each component described above may include a single element of multiple elements and some of the multiple elements may be arranged separately from the other elements. According to various embodiments, one or more components or operations of the aforementioned components may be omitted or one or more other components or operations may be added. In an embodiment of the disclosure, multiple components (e.g., modules or programs) may be integrated into a single component. In this case, the integrated component may equally or similarly perform one or more functions of each of the multiple components as if the functions are performed by the relevant components among the multiple components before the integration. According to various embodiments, operations performed by a module, a program, or other components may be carried out sequentially, in parallel, repetitively, or heuristically, one or more of the operations may be carried out in a different order or omitted, or one or more other operations may be added.

According to an aspect of an embodiment of the disclosure, provided is a method of transmitting a message by a home appliance, the method including: generating a transmission message; generating at least one sub-transmission message from the transmission message based on a limited length of a scan response data packet of Bluetooth low energy (BLE) advertising; transmitting a BLE advertising packet including header information of the transmission message; and transmitting at least one scan response data packet respectively including the at least one sub-transmission messages.

According to an embodiment of the disclosure, the header information of the transmission message may include information about a remaining advertising time in an effective time for a transmission operation of the transmission message, and the transmitting of the BLE advertising packet and the transmitting the at least one scan response data packet may be stopped after a lapse of the remaining advertising time.

According to an embodiment of the disclosure, the transmitting the BLE advertising packet and the transmitting of the at least one scan response data packet may be iterated to repetitively transmit the transmission message a predetermined number of times within the effective time.

According to an embodiment of the disclosure, the header information of the transmission message may include at least one of a service ID, service version information, a message ID, packet index information, total packet count information, remaining advertising time information, advertising change time information, display time information, or an error detection code.

According to an embodiment of the disclosure, the transmitting of the BLE advertising packet may be performed with respect to each transmitting of the at least one scan response data packet, and the transmitting of the BLE advertising packet and the transmitting of the at least one scan response data packet may be performed repetitively.

According to an embodiment of the disclosure, the BLE advertising packet may include packet index information and remaining advertising time information, and the packet index information and the remaining advertising time information which are updated based on a scan response data packet corresponding to the BLE advertising packet.

According to an embodiment of the disclosure, the BLE advertising packet may include a preamble and access address area, a packet data unit (PDU) area, and a cyclic redundancy check (CRC) area, the PDU area may include a head area, an advertiser address area, and a payload area, and the payload area may include the header information of the transmission message.

According to an embodiment of the disclosure, the method may further include collecting status information or operation information from a home appliance function module of the home appliance, and the generating the transmission message may include generating, based on detection of notification event from the status information and the operation information a transmission message including information about the notification event.

According to an embodiment of the disclosure, the method may further include receiving a Bluetooth low energy (BLE) advertising packet including a message identification (ID), packet index information, and total packet counter information; generating a buffer for a transmission message corresponding to the message ID, the buffer having a storage capacity corresponding to the total packet counter information; receiving a scan response data packet corresponding to the received BLE advertising packet; obtaining, from the scan response data packet, a sub-transmission message generated from the transmission message; storing the sub-transmission message in the buffer; iterating, until the storage capacity of the buffer is full, the receiving the BLE advertising packet, the obtaining the sub-transmission message from the scan response data packet, and the storing the sub-transmission message in the buffer; and outputting the transmission message generated from at least one sub-transmission message stored in the buffer.

According to an embodiment of the disclosure, the storing the at least one sub-transmission message in the buffer includes storing the at least one sub-transmission message in a storage space corresponding to the packet index information.

According to an embodiment of the disclosure, the received BLE advertising packet further includes manufacturer information and a service ID, and the method further comprises: determining whether to transmit a scan response request with respect to the BLE advertising packet, based on the manufacturer information and the service ID, when it is determined to transmit the scan response request, transmitting the scan response request, and the receiving the scan response data packet includes receiving the scan response data packet corresponding to the scan response request.

According to an embodiment of the disclosure, the received BLE advertising packet further includes remaining advertising time information, and the method further comprises: setting a BLE scan time based on the remaining advertising time information; and performing a BLE scan during the BLE scan time, and the BLE advertising packet and the scan response data packet are received during the BLE scan.

According to an embodiment of the disclosure, the method further includes, when the BLE scan is terminated before the storage capacity of the buffer is full, deleting the at least one sub-transmission message stored in the buffer.

According to an embodiment of the disclosure, the received BLE advertising packet includes information about an advertising change time, the received BLE advertising packet and the at least one scan response data packet are received during the BLE scan, and the method further includes setting a BLE scan cycle to be shorter than the advertising change time.

According to an embodiment of the disclosure, the received BLE advertising packet further includes display time information, the outputting the transmission message includes displaying the transmission message during a time corresponding to the display time information, and the method further includes deleting the buffer when the transmission message is output.

According to an aspect of an embodiment of the disclosure, provided is a home appliance including: a communication module; a memory storing at least one instruction; and at least one processor connected to the memory, wherein the at least one processor executes the at least one instruction to: generate a transmission message; generate at least one sub-transmission message from the transmission message based on a limited length of a scan response data packet of Bluetooth low energy (BLE) advertising; transmit, through the communication module, a BLE advertising packet of the BLE advertising including header information of the transmission message; and transmit, through the communication module, at least one scan response data packet respectively including the at least one sub-transmission message.

According to an embodiment of the disclosure, the header information of the transmission message may include information about a remaining advertising time in an effective time for a transmission operation of the transmission message, and the transmitting the advertising packet and the transmitting the at least one scan response data packet may be stopped after a lapse of the remaining advertising time.

According to an embodiment of the disclosure, the transmitting the BLE advertising packet and the transmitting the scan response data packet may be iterated to repetitively transmit the transmission message a predetermined number of times within the effective time.

According to an embodiment of the disclosure, the home appliance further includes an output interface; wherein the at least one processor is further configured to execute the at least one instruction to: receive, through the communication module, a Bluetooth low energy (BLE) advertising packet including a message identification (ID), packet index information, and total packet count information; generate a buffer for a transmission message corresponding to the message ID, the buffer having a storage capacity corresponding to the total packet count information; receive, through the communication module, a scan response data packet corresponding to the received BLE advertising packet; obtain, from the scan response data packet, a sub-transmission message generated from the transmission message; store the sub-transmission message in the buffer; iterate, until the storage capacity of the buffer is full, the receiving the BLE advertising packet, the obtaining the sub-transmission message from the scan response data packet, and the storing the sub-transmission message in the buffer; and output, through the output interface, the transmission message generated from at least one sub-transmission message stored in the buffer.

According to an aspect of an embodiment of the disclosure, provided is a computer-readable recording medium having recorded thereon a program for executing the method on a computer.

According to an aspect of an embodiment of the disclosure, provided is a method of receiving a message by a home appliance, the method including: receiving a BLE advertising packet including a message ID, packet index information, and total packet counter information; generating a buffer corresponding to a transmission message corresponding to the message ID, and having a storage capacity corresponding to the total packet count information; receiving a scan response data packet corresponding to the BLE advertising packet; obtaining from the scan response data packet a sub-transmission message generated by dividing the transmission message; storing the sub-transmission message in the generated buffer; iterating until the storage capacity of the buffer is full the receiving of the BLE advertising packet, the obtaining of the sub-transmission message from the scan response data packet, and the storing of the received sub-transmission message in the buffer; and outputting the transmission message generate from the at least one sub-transmission message stored in the buffer.

According to an embodiment of the disclosure, the storing of the sub-transmission message in the generated buffer may include storing the received sub-transmission message in a storage space corresponding to the packet index information.

According to an embodiment of the disclosure, the BLE advertising packet may further include manufacturer information and a service ID, the method may further include determining whether to transmit a scan response request with respect to the BLE advertising packet based on the manufacturer information and the service ID, and the receiving of the scan response data packet may include receiving the scan response data packet corresponding to the scan response request.

According to an embodiment of the disclosure, the BLE advertising packet may further include remaining advertising time information, the method may further include: setting a BLE scan time based on the remaining advertising time information; and performing BLE scan during performing the BLE scan time, and the BLE advertising packet and the scan response data packet may be received during performing the BLE scan.

According to an embodiment of the disclosure, the method may further include, when the BLE scan is terminated before the storage capacity of the buffer is full, deleting the sub-transmission message stored in the buffer.

According to an embodiment of the disclosure, the BLE advertising packet may include information about an advertising change time, the BLE advertising packet and the scan response data packet may be received during performing the BLE scan, and the method may further include setting a BLE scan cycle to be shorter than the advertising change time.

According to an embodiment of the disclosure, the BLE advertising packet may further include display time information, the outputting of the transmission message may include displaying the transmission message during a time corresponding to the display time information, and the method may further include deleting the buffer when the transmission message is output.

According to an aspect of an embodiment of the disclosure, provided is a home appliance including: an output interface; a communication module; a memory storing at least one instruction; and at least one processor connected to the memory, wherein the at least one processor executes the at least one instruction to: receive through the communication module a BLE advertising packet including a message ID, packet index information, and total packet count information; generate a buffer corresponding to a transmission message corresponding to the message ID, and having a storage capacity corresponding to the total packet count information; receive through the communication module a scan response data packet corresponding to the BLE advertising packet; obtain from the scan response data packet a sub-transmission message generated by dividing the transmission message; store the sub-transmission message in the generated buffer; iterate until the storage capacity of the buffer is full the receiving of the BLE advertising packet, the obtaining of the sub-transmission message from the scan response data packet, and the storing of the received sub-transmission message in the buffer; and output through the output interface the transmission message generated from the at least one sub-transmission message stored in the buffer.

The invention claimed is:

1. A method of transmitting a message by a home appliance, the method comprising:
generating a transmission message;
generating at least one sub-transmission message from the transmission message, each of the at least one sub-transmission message having a length based on a limited length of a scan response data packet of Bluetooth low energy (BLE) advertising;
transmitting a BLE advertising packet including header information of the transmission message; and
transmitting at least one scan response data packet respectively including the at least one sub-transmission message.

2. The method of claim 1, wherein the header information of the transmission message includes information about a remaining advertising time in an effective time for a transmission operation of the transmission message, and
the transmitting the BLE advertising packet and the transmitting the at least one scan response data packet are stopped after a lapse of the remaining advertising time.

3. The method of claim 2, wherein the transmitting the BLE advertising packet and the transmitting the at least one scan response data packet are iterated to repetitively transmit the transmission message a predetermined number of times within the effective time.

4. The method of claim 1, wherein the header information of the transmission message includes at least one of a service identification (ID), service version information, a message ID, packet index information, total packet count information, remaining advertising time information, advertising change time information, display time information, or an error detection code.

5. The method of claim 1, wherein the transmitting the BLE advertising packet is performed with respect to each transmitting of the at least one scan response data packet, and
the transmitting the BLE advertising packet and the transmitting the at least one scan response data packet are performed repetitively.

6. The method of claim 5, wherein the BLE advertising packet includes packet index information and remaining advertising time information, and
the packet index information and the remaining advertising time information are updated based on a scan response data packet corresponding to the BLE advertising packet.

7. The method of claim 1, wherein the BLE advertising packet includes a preamble and access address area, a packet data unit (PDU) area, and a cyclic redundancy check (CRC) area,
the PDU area includes a header area, an advertiser address area, and a payload area, and
the payload area includes the header information of the transmission message.

8. The method of claim 1, further comprising collecting status information or operation information from a home appliance function module of the home appliance, and
the generating the transmission message includes generating, based on detection of notification event from the status information and the operation information a transmission message including information about the notification event.

9. The method of claim 1, further comprising:
receiving a Bluetooth low energy (BLE) advertising packet including a message identification (ID), packet index information, and total packet counter information;
generating a buffer for a transmission message corresponding to the message ID, the buffer having a storage capacity corresponding to the total packet counter information;
receiving a scan response data packet corresponding to the received BLE advertising packet;
obtaining, from the scan response data packet, a sub-transmission message generated from the transmission message;
storing the sub-transmission message in the buffer;
iterating, until the storage capacity of the buffer is full, the receiving the BLE advertising packet, the obtaining the sub-transmission message from the scan response data packet, and the storing the sub-transmission message in the buffer; and
outputting the transmission message generated from at least one sub-transmission message stored in the buffer.

10. The method of claim 9, wherein the storing the at least one sub-transmission message in the buffer includes storing the at least one sub-transmission message in a storage space corresponding to the packet index information.

11. The method of claim 9, wherein the received BLE advertising packet further includes manufacturer information and a service ID, and
wherein the method further comprises
determining whether to transmit a scan response request with respect to the BLE advertising packet, based on the manufacturer information and the service ID, when it is determined to transmit the scan response request, transmitting the scan response request, and the receiving the scan response data packet includes receiving the scan response data packet corresponding to the scan response request.

12. The method of claim 9, wherein the received BLE advertising packet further includes remaining advertising time information, wherein the method further comprises:

setting a BLE scan time based on the remaining advertising time information; and performing a BLE scan during the BLE scan time, and wherein the BLE advertising packet and the scan response data packet are received during the BLE scan.

13. The method of claim 12, further comprising, when the BLE scan is terminated before the storage capacity of the buffer is full, deleting the at least one sub-transmission message stored in the buffer.

14. The method of claim 12, wherein the received BLE advertising packet includes information about an advertising change time, wherein the received BLE advertising packet and the at least one scan response data packet are received during the BLE scan, and wherein the method further comprises setting a BLE scan cycle to be shorter than the advertising change time.

15. The method of claim 9, wherein the received BLE advertising packet further includes display time information, wherein the outputting the transmission message includes displaying the transmission message during a time corresponding to the display time information, and wherein the method further comprises deleting the buffer when the transmission message is output.

16. A home appliance comprising:

a communication module;

a memory storing at least one instruction; and at least one processor connected to the memory, wherein the at least one processor is configured to execute the at least one instruction to:

generate a transmission message;

generate at least one sub-transmission message from the transmission message, each of the at least one sub-transmission message having a length based on a limited length of a scan response data packet of Bluetooth low energy (BLE) advertising;

transmit, through the communication module, a BLE advertising packet of the BLE advertising including header information of the transmission message; and transmit, through the communication module, at least one scan response data packet respectively including the at least one sub-transmission message.

17. The home appliance of claim 16, wherein the header information of the transmission message includes information about a remaining advertising time in an effective time for a transmission operation of the transmission message, and the transmitting the advertising packet and the transmitting the at least one scan response data packet are stopped after a lapse of the remaining advertising time.

18. The home appliance of claim 17, wherein the transmitting the BLE advertising packet and the transmitting the scan response data packet are iterated to repetitively transmit the transmission message a predetermined number of times within the effective time.

19. The home appliance of claim 16, further comprising an output interface;

wherein the at least one processor is further configured to execute the at least one instruction to:

receive, through the communication module, a Bluetooth low energy (BLE) advertising packet including a message identification (ID), packet index information, and total packet count information;

generate a buffer for a transmission message corresponding to the message ID, the buffer having a storage capacity corresponding to the total packet count information;

receive, through the communication module, a scan response data packet corresponding to the received BLE advertising packet;

obtain, from the scan response data packet, a sub-transmission message generated from the transmission message;

store the sub-transmission message in the buffer;

iterate, until the storage capacity of the buffer is full, the receiving the BLE advertising packet, the obtaining the sub-transmission message from the scan response data packet, and the storing the sub-transmission message in the buffer; and output, through the output interface, the transmission message generated from at least one sub-transmission message stored in the buffer.

20. A computer-readable recording medium having recorded thereon a program which, when executed by a computer, causes the computer to perform the method of claim 1.

* * * * *